(12) United States Patent
Wilson et al.

(10) Patent No.: US 10,944,809 B2
(45) Date of Patent: *Mar. 9, 2021

(54) READING MULTIPLEXED DEVICE STREAMS

(71) Applicant: Microsoft Technology Licensing, LLC, Redmond, WA (US)

(72) Inventors: Mei L. Wilson, Redmond, WA (US); Aleksey Kabanov, Bellevue, WA (US); Trevor Baron, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/561,989

(22) Filed: Sep. 5, 2019

(65) Prior Publication Data

US 2020/0021635 A1  Jan. 16, 2020

Related U.S. Application Data

(63) Continuation of application No. 15/362,644, filed on Nov. 28, 2016, now Pat. No. 10,440,086.

(51) Int. Cl.
*H04L 29/06* (2006.01)

(52) U.S. Cl.
CPC .......... *H04L 65/80* (2013.01); *H04L 65/4069* (2013.01); *H04L 65/605* (2013.01); *H04L 65/607* (2013.01)

(58) Field of Classification Search
CPC ... H04L 65/80; H04L 65/4069; H04L 65/605; H04L 65/607
See application file for complete search history.

(56) References Cited

U.S. PATENT DOCUMENTS

| | | | | |
|---|---|---|---|---|
| 2007/0239399 | A1* | 10/2007 | Sheynblat | G06F 9/542 702/187 |
| 2011/0032338 | A1* | 2/2011 | Raveendran | H04N 21/816 348/51 |
| 2011/0193958 | A1* | 8/2011 | Martin | H04N 7/181 348/143 |
| 2013/0141642 | A1* | 6/2013 | Wu | G06F 3/1407 348/441 |
| 2013/0188923 | A1* | 7/2013 | Hartley | H04N 9/87 386/241 |
| 2014/0334381 | A1* | 11/2014 | Subramaniam | H04L 65/604 370/328 |

* cited by examiner

*Primary Examiner* — Wing F Chan
*Assistant Examiner* — Billy H Ng
(74) *Attorney, Agent, or Firm* — Arent Fox LLP

(57) ABSTRACT

Described are examples for obtaining data from a single stream output. An indication of requested data from multiple stream sources can be received from an application. A single stream output including one or more output frames can be received from a stream server where at least one output frame includes at least data from each of the multiple stream sources. The requested data can be extracted from the single stream output and provided to the application.

26 Claims, 13 Drawing Sheets

READING MULTIPLEXED DEVICE STREAMS

CLAIM OF PRIORITY UNDER 35 U.S.C. § 119

The present application is a continuation of application Ser. No. 15/362,644, entitled "READING MULTIPLEXED DEVICE STREAMS" filed on Nov. 28, 2016, which is assigned to the assignee hereof and hereby expressly incorporated by reference herein for all purposes.

BACKGROUND

Many computing devices employ input devices that produce output streams for consumption by applications operating on the computing device. These input devices can include sensor devices (e.g., cameras, biometric devices, etc.) that obtain and output data in streams including a plurality of data frames, where the data frames are output according to a cadence. A given input device is typically associated with a driver at the operating system of the computing device that provides an interface to the input device allowing applications executing via the operating system to access and utilize the output stream for a given input device. The drivers, however, are typically provided by a hardware vendor of the input device, and are thus limited to exposing functions of a single input device that are defined by the hardware vendor when implementing the driver.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a method for obtaining data from a single stream output is provided. The method includes receiving, from an application, an indication of requested data from multiple stream sources, receiving, from a stream server, the single stream output including one or more output frames where at least one output frame includes at least data from each of the multiple stream sources, extracting the requested data from the single stream output, and providing the requested data to the application.

In another example, a device for outputting stream data from a plurality of stream sources is provided. The device includes a memory storing one or more parameters or instructions for executing a stream server, wherein the stream server interfaces with a plurality of stream sources, and at least one processor coupled to the memory. The at least one processor is configured to receive, from an application, an indication of requested data from multiple stream sources, receive, from the stream server, the single stream output including one or more output frames where at least one output frame includes at least data from each of the multiple stream sources, extract the requested data from the single stream output, and provide the requested data to the application.

In another example, a computer-readable medium, including code executable by one or more processors for outputting stream data from a plurality of stream sources is provided. The code includes code for receiving, from an application, an indication of requested data from multiple stream sources, receiving, from a stream server, the single stream output including one or more output frames where at least one output frame includes at least data from each of the multiple stream sources, extracting the requested data from the single stream output, and providing the requested data to the application.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
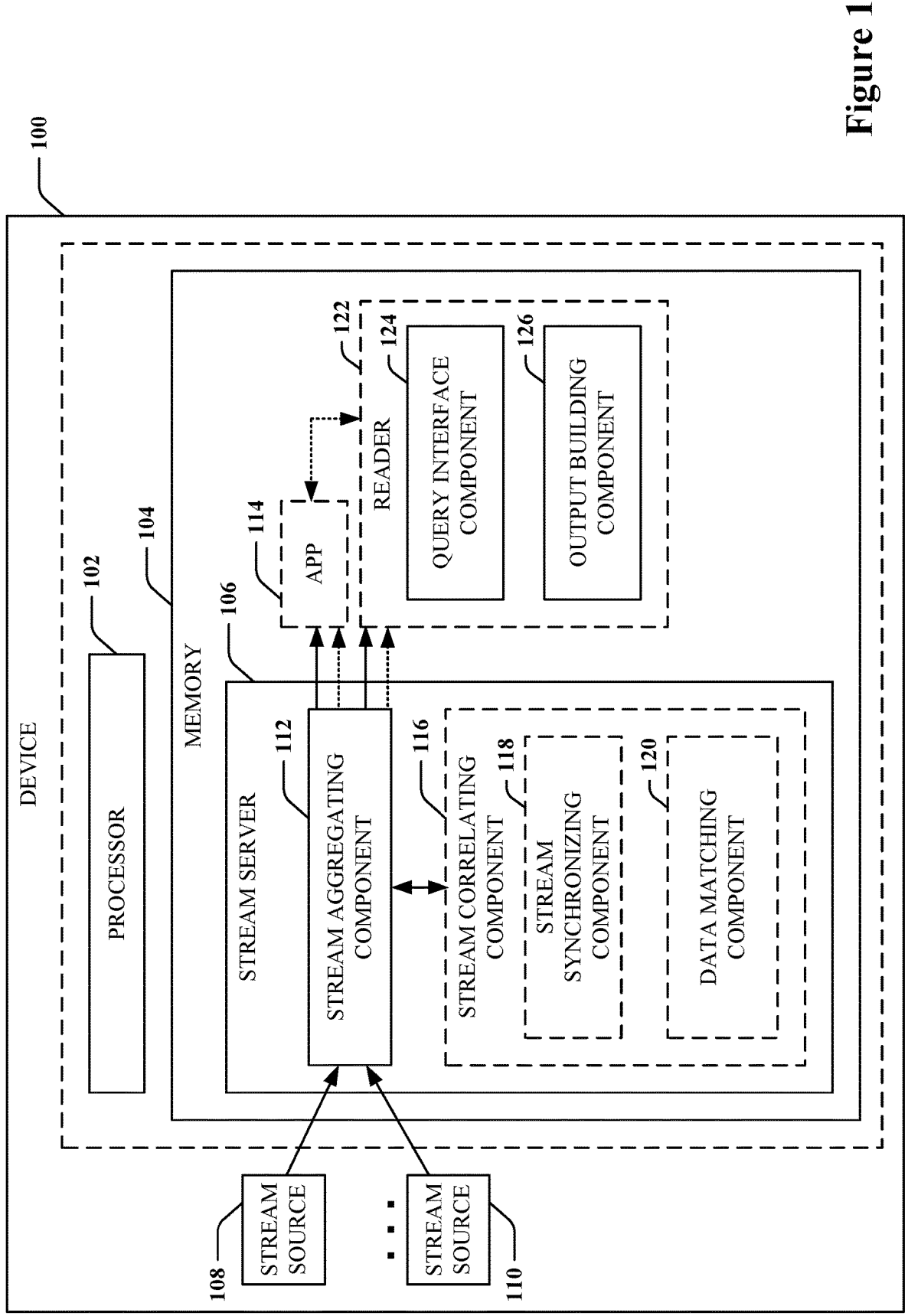
FIG. 1 is a schematic diagram of an example of a device for multiplexing and/or temporally correlating data from a plurality of stream sources.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to multiplexing multiple device streams into a single stream output for consumption by one or more applications or other components of a computing device. In an example, the device streams may have different attributes, such as different media types, cadence, size, etc., and attributes of the single stream output can be determined based on the attributes of the multiple device streams. In addition, for example, the single stream output may include output frames that include data from at least a portion of the device streams (e.g., where data from the portion of device streams is available in a period of time corresponding to the output frame). In an example, the output frames may include a data structure having containers for separately storing data from each device stream having data corresponding to the period of time of the given output frame. In addition, the single stream output may include multiple samples of different aggregations (e.g., combinations) of the multiple device streams. In this regard, for example, the one or more applications or other components of the computing device receiving the one or more frames of the single stream output can query into the single stream output to retrieve desired data in the one or more output frames (e.g., from the corresponding containers in the data structure).

In an example, the multiple device streams can be temporally correlated in generating the single stream output such that data related to similar periods of time in the multiple device streams are aggregated in the one or more output frames. The temporal correlation can be performed in generating the single stream output to mitigate inaccuracies caused by different latencies, clock drift, etc., which may result in jitter or other undesirable properties, that may be associated with post processing the device streams. In an example, the multiple device streams may be synchronized to provide the temporal correlation (e.g., by starting the device streams at a similar time, by determining a timestamp of data from one device stream as similar to another timestamp of other data from another device stream, etc.). Moreover, for example, data from the multiple device streams may be matched to a candidate time (e.g., based on relative system timestamps, duration of the data, etc.) to provide the temporal correlation. In addition, in an example, data that cannot be matched may be dropped from the single stream output in temporally correlating the device streams into the single stream output.

In one example use case, the present disclosure may be implemented in a computer device having a plurality of sensors (e.g., cameras or other biometrics sensors, position determining devices, location determining devices, etc.). The computer device may include a stream server for receiving data streams from the plurality of sensors. The stream server can aggregate and/or temporally correlate data streams from the plurality of sensors, synchronize the data streams, etc. For instance, the computing device may employ two cameras, such as a red green blue (RGB) camera and an infrared (IR) camera. The stream server can aggregate the data streams from the RGB camera and the IR camera into a single stream output, which an application can access and extract data related to the RGB camera and/or the IR camera. In another example, the stream server can temporally correlate the data streams of the RGB camera and the IR camera, such that the single stream output provides temporally correlated camera data, which the application can access and extract. Multiplexing the data streams into the single stream output can simplify sending of the data of multiple streams, and temporally correlating the data at the stream server can save an application from the complexity of attempting to temporally correlate data from multiple streams and can improve accuracy of the correlation by mitigating processing delays that may occur at each data stream.

Turning now to FIGS. 1-13, examples are depicted with reference to one or more components and one or more methods that may perform the actions or operations described herein, where components and/or actions/operations in dashed line may be optional. Although the operations described below in FIGS. 2, 4-6, and 8-10 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a device 100 (e.g., a computing device) that can implement a stream server for aggregating and/or correlating data from a plurality of stream sources. In an example, device 100 can include a processor 102 and/or memory 104 configured to execute or store instructions or other parameters related to providing the stream server 106. For example, processor 102 and memory 104 may be separate components communicatively coupled by a bus (e.g., on a motherboard or other portion of a computing device, on an integrated circuit, such as a system on a chip (SoC), etc.), components integrated within one another (e.g., processor 102 can include the memory 104 as an on-board component), and/or the like. Memory 104 may store instructions, parameters, data structures, etc. for use/execution by processor 102 to perform functions described herein. Device 100 can also include one or more stream sources 108, 110 for obtaining input (e.g., video input, audio input, biometric input or other input that can be obtained in frames of data, etc.) and outputting a corresponding data stream. For example, the one or more stream sources 108, 110 may include one or more sensor devices (e.g., a RGB camera, IR camera, depth camera, etc.), which may be video cameras, still image cameras, etc., an eye scan or eye tracking sensor, a fingerprint or touch sensor, a microphone, etc. For example, the stream sources 108, 110 may be internal or external to the device 100, and may be communicatively coupled to the computing device via substantially any wired or wireless interface (e.g., universal serial bus (USB), Firewire, local area network (LAN), wireless LAN (WLAN), Bluetooth, radio frequency identification (RFID), near field communication (NFC), etc.).

In an example, stream server 106 can obtain output streams (e.g., streams of framed data) of stream sources 108, 110 for exposing as an input to one or more applications 114 or a reader 122 for consumption thereof. Framed data, for example, can correspond to data from the stream sources 108, 110 that is output according to a cadence. In one example, the framed data can correspond to the data as captured according to the cadence (e.g., frames per second for a camera). In an example, stream server 106 can include a stream aggregating component 112 for receiving data streams from the stream sources 108, 110 and outputting a multiplexed data stream, one or more temporally correlated data streams, etc. to one or more applications 114 or a reader 122 or other components. The data stream(s) output by stream aggregating component 112 may also output framed data, and the data and/or framing parameters (e.g., cadence) may be the same as or modified from the data and/or framing parameters as received from the stream sources 108, 110. Though two stream sources 108, 110 are shown, substantially any number of stream sources can be coupled to device 100 and used to input data streams to stream aggregating component 112. In addition, in this regard, stream aggregating component 112 can output multiple samples of different aggregations (e.g., combinations) of the input data streams.

Stream server 106 may also include a stream correlating component 116 for correlating the data streams (or frames thereof) received from stream sources 108, 110. For example, stream correlating component 116 can provide temporal correlation of the data streams from stream sources 108, 110 based on a physical time related to frames of the data streams. For example, stream correlating component 116 can include a stream synchronizing component 118 for synchronizing the data streams of the plurality of stream sources 108, 110 so the frames received from the data streams are synchronized for providing in one or more output streams, and/or a data matching component 120 for matching data received in frames of a data stream from the plurality of stream sources 108, 110 based on a candidate period of time for providing in one or more output streams.

In a specific example, stream sources 108, 110 can correspond to sensor devices, such as a RGB camera and an IR camera. Stream server 106 can communicate with the sensor devices (e.g., via an interface) to obtain data stream input as stream sources 108, 110. Accordingly, stream aggregating component 112 can receive data streams from stream sources 108, 110 in the form of RGB camera video frames and IR camera video frames, respectively. As described, stream sources 108, 110 can have associated cadences for transmitting framed data, which may be different. For example, stream source 108 may have a cadence of 30 frames per second (fps) while stream source 110 may have a cadence of 60 fps. In addition, stream sources 108, 110 can have different sized frames, different framed data types (e.g., different file types for outputting the frames), such as Moving Picture Experts Group (MPEG), Joint Photographic Experts Group (JPEG)-compressed data, portable network graphics (PNG), etc.

In any case, stream aggregating component 112 can receive the data streams from the stream sources 108, 110, and output the data streams multiplexed in a single stream output. For example, stream aggregating component 112 can output the data streams in separate containers of a data structure provided in one or more output frames of the single stream output. In an example, stream aggregating component 112 can output framed data from the data streams in the single stream output as received from the stream sources 108, 110 (e.g., based on a timing at which the data streams are received from stream sources 108, 110). In this example, application 114 can query and retrieve desired data from the single stream output (e.g., directly and/or via a reader 122). For example, reader 122 can be provided for obtaining the aggregated streams from stream aggregating component 112 and providing an interface to access certain data from the streams. For example, reader 122 can include a query interface component 124 that can provide an interface to one or more applications 114 for obtaining a configuration of streams available from the stream aggregating component 112, and specifying a list of streams or related data to be obtained for the one or more applications 114. In one example, query interface component 124 can provide the configuration indicating the individual stream sources 108, 110 available for consumption. Reader 122 can also include an output building component 126 for obtaining streams or related data requested by the one or more applications 114 from the single stream output, and exposing an interface to obtain the requested streams or related data from reader 122.

In addition, for example, stream correlating component 116 can temporally correlate framed data from the data streams in the single stream outputs (and/or in multiple synchronized stream outputs). For instance, data matching component 120 can match one or more samples of data in framed data from the data streams based on candidate period of time, and provide the framed data as matched in the single stream output and/or contemporaneously in multiple stream outputs. In another example, stream synchronizing component 118 can synchronize the data streams such that framed data is received from the data streams at similar times and/or based on a same system time, for providing correlated output from the streams in a single stream output and/or contemporaneously in multiple stream outputs.

Figure 2:
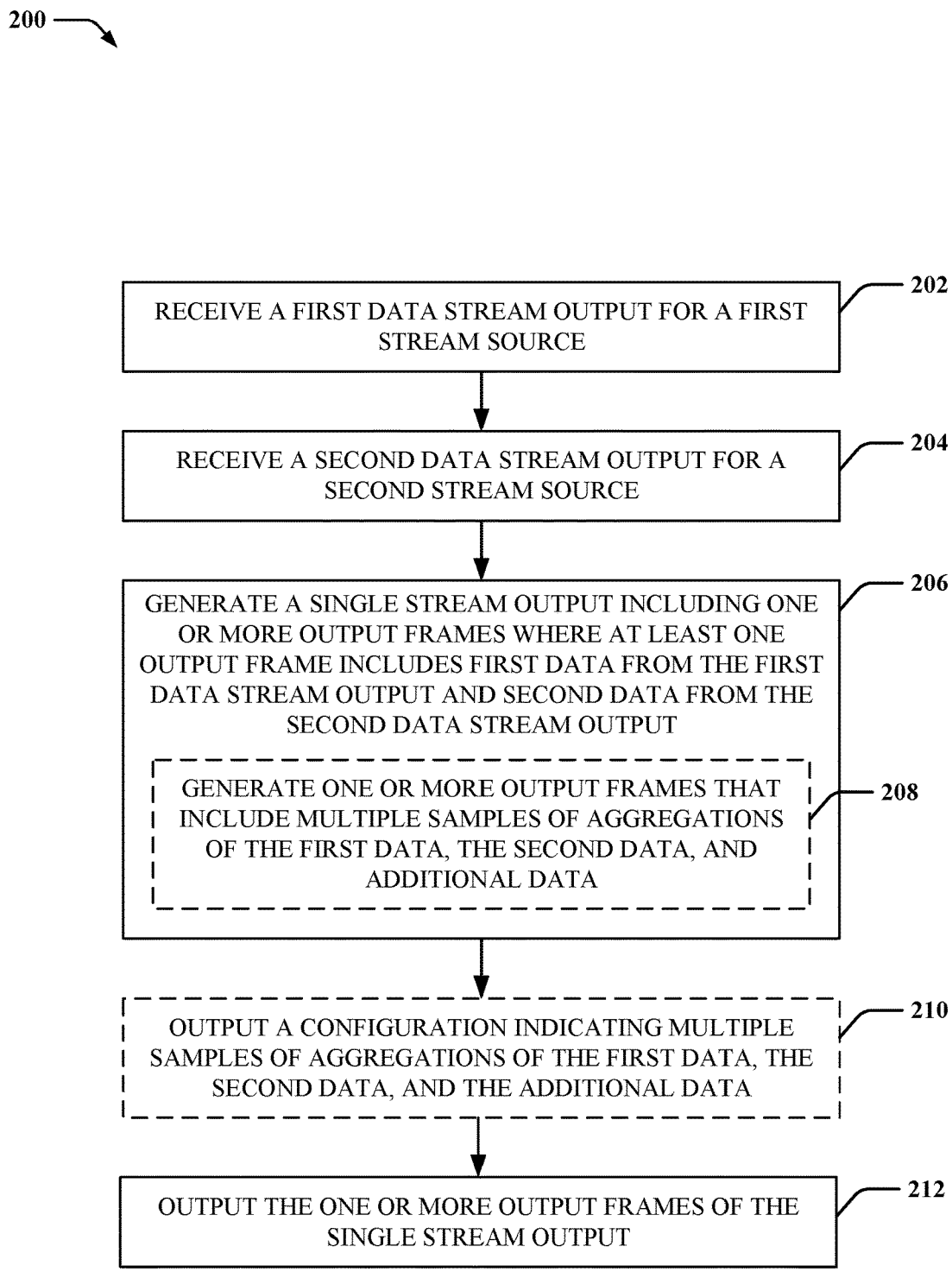
FIG. 2 is a flow diagram of an example of a method for multiplexing data from a plurality of stream sources.

FIG. 2 is a flowchart of an example of a method 200 for generating a multiplexed stream output of data from multiple stream sources. For example, method 200 can be performed by a device 100 and/or one or more components thereof to facilitate multiplexing multiple stream sources.

In method 200, at action 202, a first data stream output for a first stream source can be received. In an example, stream aggregating component 112, e.g., in conjunction with processor 102, memory 104, stream server 106, etc., can receive the first data stream output for the first stream source (e.g., stream source 108). In method 200, at action 204, a second data stream output for a second stream source can be received. In an example, stream aggregating component 112, e.g., in conjunction with processor 102, memory 104, stream server 106, etc., can receive the second data stream output for the second stream source (e.g., stream source 110).

For example, one or more of stream sources 108, 110 can correspond to a sensor device or other input device coupled to device 100 that can provide a data stream corresponding to input at the sensor device. For example, the sensor device may include one or more cameras (e.g., RGB camera, IR camera, depth camera, etc.), biometric sensors, microphones, etc., as described, that may provide framed data sent at a cadence in a data stream exposed as stream source 108 (e.g., via an interface of the sensor device). In another example, one or more of stream sources 108, 110 can relate to a stream augmenting component, as described further herein, or substantially any source from which a data stream of framed data sent at a cadence can be received. In any case, for example, stream sources 108, 110 can correspond to data sent at different cadences, data of different sizes and/or media types, etc. In one example, attributes of the stream sources 108, 110, such as a data/packet size, media type, cadence, etc. may be specified in attribute information provided with the stream sources 108, 110 (e.g., accessible via an interface to the stream sources 108, 110).

In method 200, at action 206, a single stream output including one or more output frames can be generated where at least one output frame includes first data from the first data stream output and second data from the second data stream output. In an example, stream aggregating component 112, e.g., in conjunction with processor 102, memory 104, stream server 106, etc., can generate the single stream output including one or more output frames where at least one output frame includes first data from the first data stream output and second data from the second data stream output.

For example, the single stream output may include the first data and second data aggregated in the single stream output. In an example, stream aggregating component 112 can include a data structure in the at least one output frame where the data structure has at least a first container for the first data and a second container for the second data. In this regard, application 114 can obtain the first data from the first container and the second data from the second container using an interface provided by the stream server 106. Moreover, for example, the data structure can include attribute information for the data structure (e.g., size, cadence, etc.) as well as attribute information for each of the stream sources 108, 110 corresponding to the data in the data structure (e.g., data/packet size, media type, cadence, sensor type, a sensor location—e.g., relative to a chassis of the device 100, one or more parameters for correlating the steam output with other stream outputs such as a timestamp of the data, etc. for the given stream source 108, 110).

Figure 3:
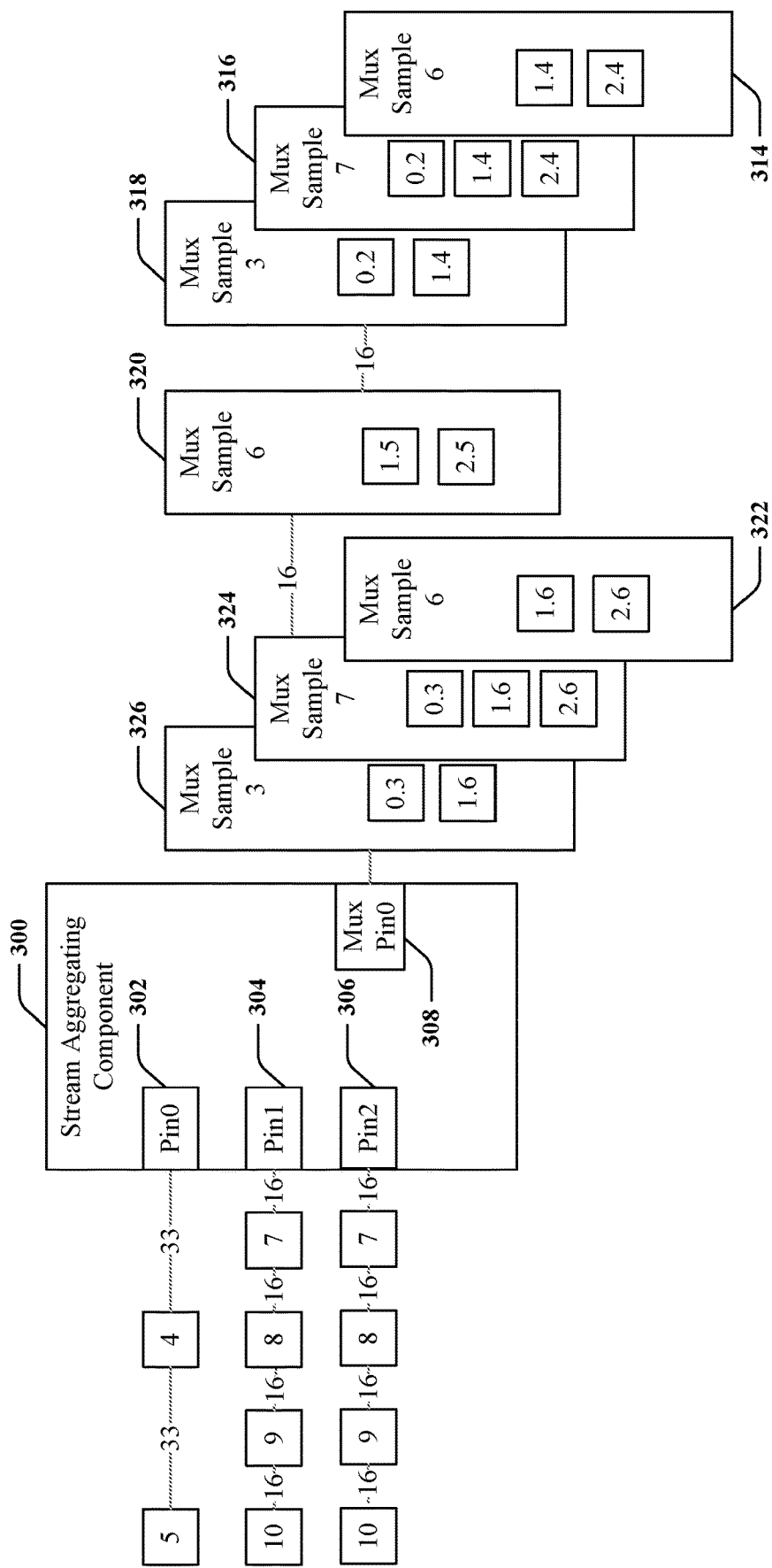
FIG. 3 is a schematic diagram of an example of an example stream aggregating component for multiplexing data from a plurality of stream sources.

In generating the single stream output at action 206, optionally at action 208, one or more output frames can be generated that include multiple samples of aggregations of the first data, the second data, and additional data. In an example, stream aggregating component 112, e.g., in conjunction with processor 102, memory 104, stream server 106, etc., can generate the one or more output frames that include multiple samples of aggregations of the first data, the second data, and additional data. For example, each sample can include a different combination of the first data, the second data, and additional data (e.g., data streams from one or more other stream sources). In an example, stream aggregating component 112 may not include all possible combinations of data in the samples (e.g., to lessen complexity and/or resources for aggregating and/or extracting the data). Additionally, in this example, stream aggregating component 112 can configure the different samples along with an identifier or index, and/or can indicate the configuration in one or more parameters output by the stream aggregating component 112. For example, stream aggregating component 112 can provide an interface for obtaining (e.g., by an application 114 and/or reader 122) a list of the possible samples in a given output frame and the corresponding stream sources for which data is output in the samples. FIG. 3 shows an example.

FIG. 3 illustrates a specific example of a stream aggregating component 300, which may be similar to stream aggregating component 112, having 3 "pins" corresponding to stream sources—Pin0 302, Pin1 304, Pin2 306—and a single stream output pin—Mux Pin0 308. In this example, stream aggregating component 300 outputs output frames as mux samples 314, 316, 318, 320, 322, 324, 326 each having multiple data or samples from multiple Pins (e.g., Pin0 302, Pin1 304, and/or Pin2 306) per output frame. For example, each mux sample having a given index can correspond to an output frame of a single stream output corresponding to the index (e.g., mux samples 314, 320, 322 having index 6 can correspond to a single stream output that is output at a cadence of 16 milliseconds (ms), mux samples 316 and 324 having index 7 can correspond to a single stream output that is output at a cadence of 33 ms, etc.). In addition, each single stream output can output frames from a subset of the stream sources (e.g., one single stream output associated with mux sample index 3 can output frames from Pin0 302 and Pin1 304, as described further herein).

In an example, a stream source can input frames indexed as 2, 3, 4, and 5 that are 33 ms apart into Pin0 302 (where frames 2 and 3 are shown as output in mux samples 316, 318, 324, 326 indexed as 3 and 7), a different stream source can input frames indexed as 4, 5, 6, 7, 8, 9, and 10 that are 16 ms apart into Pin1 304 (where frames 4, 5, and 6 are shown as output in mux samples 314, 316, 318, 320, 322, 324, 326 indexed as 3, 6, and 7). Similarly, another stream source can input frames indexed as 4, 5, 6, 7, 8, 9, and 10 that are 16 ms apart into Pin2 306 (where frames 4, 5, and 6 are shown as output in mux samples 314, 316, 320, 322, 324 indexed as 3 and 6). Stream aggregating component 300 can aggregate the input frames from two or more of Pin0 302, Pin1 304, and Pin2 306 into different aggregations in one or more single stream outputs corresponding to a mux sample index. For example, in a first mux sample 316 for a single stream output, stream aggregating component 300 can aggregate frame 2 from Pin0 302, frame 4 from Pin1 304, and/or frame 4 from Pin2 306.

As shown, for example, stream aggregating component 300 can generate output frames that have one or more of mux samples having an index 3 and including output from Pin0 302 and Pin1 304, mux samples having an index 6, and including output from Pin1 304 and Pin2 306, or mux samples having an index 7, and including output from Pin0 302, Pin1 304, and Pin2 306. In an example, stream aggregating component 300 can output a frame including mux sample 314 having an index 6 and including frame 4 from Pin1 304 (labeled 1.4) and frame 4 from Pin2 306 (labeled 2.4), mux sample 316 having an index 7 and including frame 2 from Pin0 302 (labeled 0.2), frame 4 from Pin1 304 (labeled 1.4), and frame 4 from Pin2 306 (labeled 2.4), and mux sample 318 having an index 3 and including frame 2 from Pin0 302 (labeled 0.2) and frame 4 from Pin1 304 (labeled 1.4). Accordingly, an application can receive the output frame, determine a desired mux sample based on the index, and extract frames from desired stream sources from the corresponding containers.

In addition, stream aggregating component can generate an output frame 16 ms later that includes mux sample 320 having index 6 and include frame 5 from Pin1 304 (labeled 1.5) and frame 5 from Pin2 306 (labeled 2.5), as there is no incoming frame from Pin0 302 at this time. Subsequently, stream aggregating component 300 can another output frame 16 ms later including mux sample 322 having an index 6 and including frame 6 from Pin1 304 (labeled 1.6) and frame 6 from Pin2 306 (labeled 2.6), mux sample 316 having an index 7 and including frame 3 from Pin0 302 (labeled 0.3), frame 6 from Pin1 304 (labeled 1.6), and frame 6 from Pin2 306 (labeled 2.6), and mux sample 318 having an index 3 and including frame 3 from Pin0 302 (labeled 0.3) and frame 6 from Pin1 304 (labeled 1.6), and so on.

Referring again to FIG. 2, in method 200, optionally at action 210, a configuration indicating multiple samples of aggregations of the first data, the second data, and the additional data can be output. In an example, stream aggregating component 112, e.g., in conjunction with processor 102, memory 104, stream server 106, etc., may output the configuration indicating the multiple samples of aggregations of the first data, the second data, and the additional data. For example, stream aggregating component 112 can provide the configuration via an interface, which one or more applications 114 or a reader 122 (or other components) can access to obtain the configuration, and accordingly extract data from the single stream output. For example, the configuration may indicate an index of samples in the single stream output (e.g., mux sample indices 3, 6, and 7 in FIG. 3) along with a list of stream source indices for one or more of the samples having a data container in the one or more samples (e.g., an index of the stream source related to Pin0 302, and an index of the stream source related to Pin1 304 for index 3 in FIG. 3). Thus, for example, an application 114 or reader 122 receiving the single stream output from the stream aggregating component 112 can obtain data for one or more stream sources based on determining which sample index and container thereof corresponds to the stream source (s), detect samples received over the single stream output that correspond to the index, and obtain data from the corresponding container in the detected samples. In one example, as described further herein, reader 122 can obtain multiple streams from the single stream output based on queries from multiple applications, and can allow the applications to obtain desired stream data via the reader 122.

In method 200, at action 212, the one or more output frames of the single stream output can be output. In an example, stream aggregating component 112, e.g., in conjunction with processor 102, memory 104, stream server 106, etc., can output the one or more output frames of the single stream output. For example, stream aggregating component 112 can output the one or more output frames using an interface. For example, application 114 and/or reader 122 can receive the one or more output frames via the interface (e.g., by registering a callback function to receive the one or more output frames when generated by the stream aggregating component 112. Thus, for example, stream aggregating component 112 can call a callback function of the application 114 and/or reader 122 with the generated single stream output. The application 114 and/or reader 122 can accordingly determine whether the one or more output frames include an aggregated sample with stream data from a stream source 108, 110 and can access a related container to obtain the stream data from the stream source.

Figure 4:
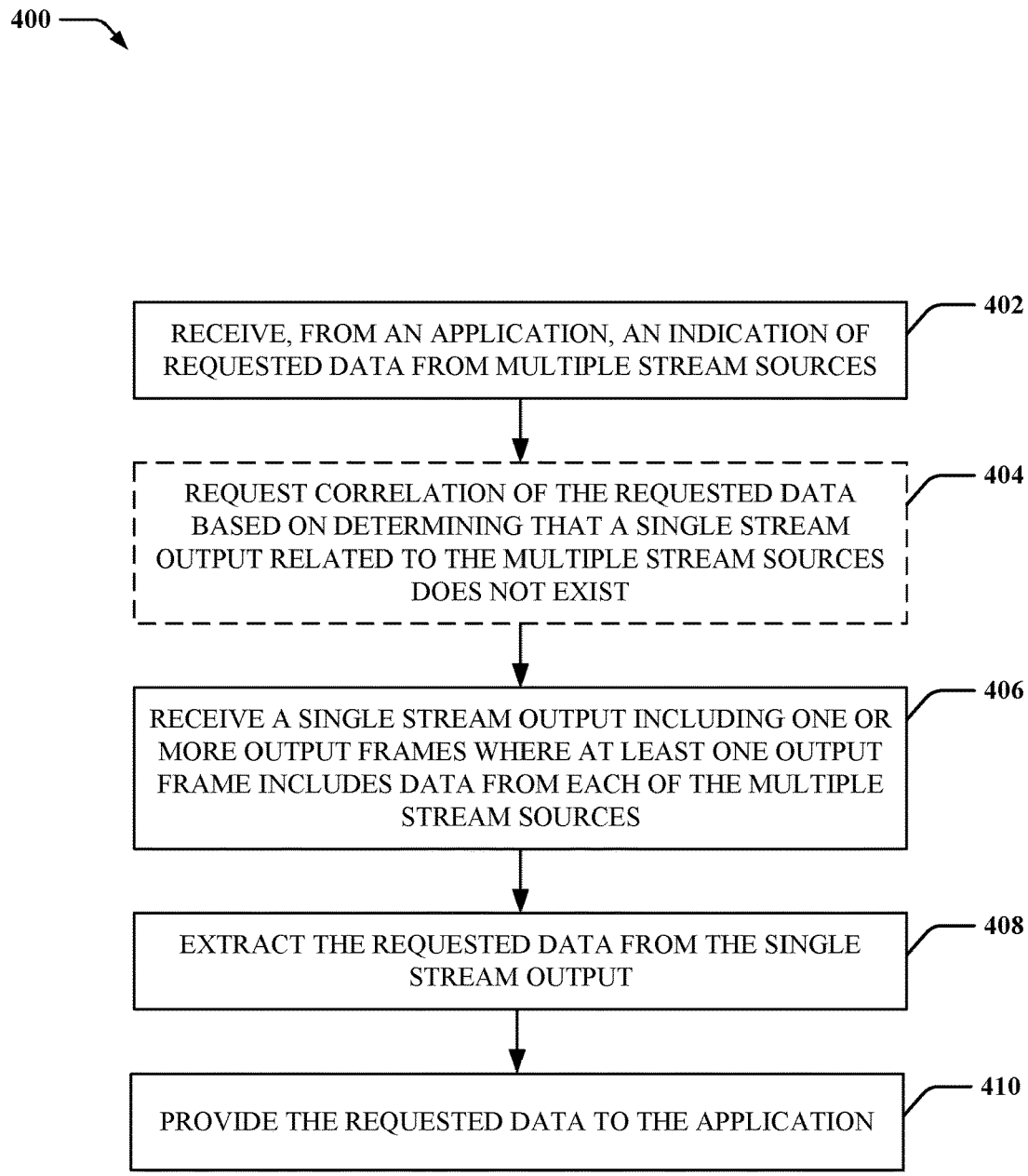
FIG. 4 is a flow diagram of an example of a method for obtaining data from a stream output that includes multiplexed data from a plurality of stream sources.

FIG. 4 is a flowchart of an example of a method 400 for allowing applications to request data from multiple stream sources (e.g., via a reader). For example, method 400 can be performed by a device 100 and/or one or more components thereof, such as a reader 122, to facilitate providing an application with requested data from multiple stream sources.

In method 400, at action 402, an indication of requested data from multiple stream sources can be received from an application. In an example, query interface component 124, e.g., in conjunction with processor 102, memory 104, reader 122, etc., can receive, from the application (e.g., application 114), the indication of requested data from multiple stream sources (e.g., stream sources 108, 110). In an example, application 114 can utilize the query interface component 124 of the reader 122 to initialize an instance of the reader 122 for obtaining certain data from the multiple stream sources. In one example, query interface component 124 may provide the application 114 with one or more parameters regarding data that can be obtained from the multiple stream sources. For example, the stream sources, one or more stream augmenting components (as described further herein), etc. may advertise available outputs via stream server 106, and query interface component 124 can access the stream server 106 to determine a set of available data for each of a plurality of stream sources. The query interface component 124 can then indicate the sets of available data that can be requested from the stream sources, stream augmenting components, etc. via stream server 106 (e.g., in response to a query from the application 114). Application 114 can accordingly determine the sets of available data and/or can provide an indication of requested data to the reader 122.

In method 400, optionally at action 404, correlation of the requested data can be requested based on determining that a single stream output related to the multiple stream sources does not exist. In an example, query interface component 124, e.g., in conjunction with processor 102, memory 104, reader 122, etc., can request (e.g., from stream server 106) correlation of the requested data based on determining that a single stream output related to the multiple stream sources does not exist. For example, query interface component 124 may determine, based on information from stream server 106 whether stream outputs related to the requested data are available from one or more stream sources 108, 110, one or more stream augmenting components, etc. If not, query interface component 124 can request the stream server 106 obtain and correlate data from the stream sources. Referring to FIG. 3, where the application 114 requests data related to Pin0 302 and Pin2 306, and query interface component 124 determines that a single stream output having data from these Pins is not available, query interface component 124 can request a single stream output with data from these Pins, in response to which stream server 106 may expose a single stream output (e.g., mux sample) with outputs from Pin0 302 and Pin2 306 (and/or Pin1 304).

In method 400, at action 406, a single stream output can be received including one or more output frames where at least one output frame includes data from each of the multiple stream sources. In an example, output building component 126, e.g., in conjunction with processor 102, memory 104, reader 122, etc., can receive the single stream output including the one or more output frames where at least one output frame includes data from each of the multiple stream sources. For example, output building component 126 can receive the single stream output from stream aggregating component 112 or other component of the stream server 106, which may include data from the multiple stream sources 108, 110, one or more stream augmenting components, correlated data from the multiple stream sources or stream augmenting components, as described further herein, etc. In one example, the single stream output may include frames where each frame has data from the multiple stream sources. The data from the multiple stream sources may be separated into containers in the frame, where each container corresponds to a stream source or a type (e.g., media type) of data from the stream source.

In method 400, at action 408, the requested data can be extracted from the single stream output. In an example, output building component 126, e.g., in conjunction with processor 102, memory 104, reader 122, etc., can extract the requested data from the single stream output. As described, for example, the single stream output may include more data than that requested by the application 114. The additional data may correspond to other stream sources, other data from the multiple stream sources that was not requested, etc. In any case, output building component 126 can extract out the requested data from the single stream output into a data structure for providing to the application 114. In one example, the output building component 126 can extract the requested data from containers of the single stream output at each frame, and can formulate the requested data into a data structure for providing to the application 114.

In method 400, at action 410, the requested data can be provided to the application. In an example, reader 122, e.g., in conjunction with processor 102, memory 104, etc., can provide the requested data to the application. For example, reader 122 can provide the requested data in response to the indication for requested data received from the application 114. In another example, reader 122 can provide the requested data to the application 114 using a callback function registered by the application 114 (e.g., where the callback function may be indicated the requested data), or application 114 can explicitly request the data via an interface to the reader 122 (e.g., based on the reader 122 notifying the application 114 that data is present). In one example, reader 122 can provide the data at a cadence corresponding to one or more streams corresponding to the one or more stream sources and/or to the single stream output received from the stream server 106.

In a specific example, the application 114 can request color and depth camera data from the reader 122. Reader 122 can obtain a stream output from the stream server 106 that includes data from an RGB camera stream source and a depth camera stream source of device 100 (and/or additional stream sources). For example, reader 122 can receive the stream output from the stream server as another stream with framed data where the framed data includes correlated data from at least the RGB camera stream source and the depth camera stream source. In addition, in an example, the data provided to reader 122 can be temporally correlated by the stream server 106, as described further herein. In one example, where reader 122 determines that a stream output having both color and depth information is not available, reader 122 can request an associated stream output from the stream server 106, and the stream server may initialize a stream output with data from at least the corresponding stream sources. In any case, as reader 122 receives the stream output, it can provide the requested output to the application 114 (e.g., by calling a callback function or otherwise responding to a query from the application 114). Thus, the reader 122 can extract away some of the logic used by the stream server 106 in building one or more stream outputs, as described above.

Figure 5:
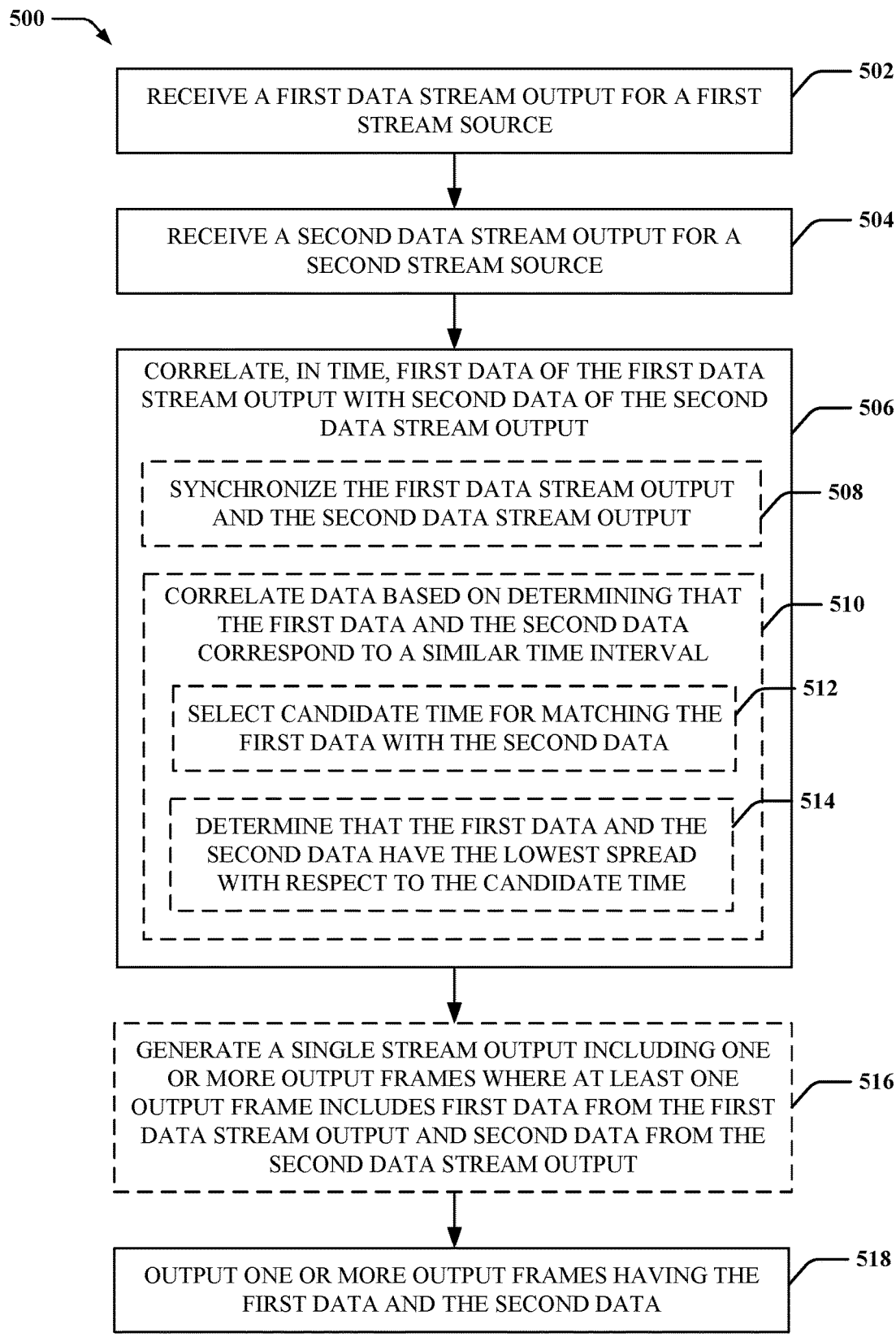
FIG. 5 is a flow diagram of an example of a method for temporally correlating multiplexed data from a plurality of stream sources.

FIG. 5 is a flowchart of an example of a method 500 for correlating output from multiple stream sources. For example, method 500 can be performed by a device 100 and/or one or more components thereof to facilitate correlating the output from the multiple stream sources.

In method 500, at action 502, a first data stream output for a first stream source can be received, as described in action 202 of method 200. In an example, stream aggregating component 112, e.g., in conjunction with processor 102, memory 104, stream server 106, etc., can receive the first data stream output for the first stream source (e.g., stream source 108). In method 500, at action 504, a second data stream output for a second stream source can be received, as described in action 204 of method 200. In an example, stream aggregating component 112, e.g., in conjunction with processor 102, memory 104, stream server 106, etc., can receive the second data stream output for the second stream source (e.g., stream source 110).

In method 500, at action 506, first data of the first data stream output can be correlated, in time, with second data of the second data stream output. In an example, stream correlating component 116, e.g., in conjunction with processor 102, memory 104, stream server 106, etc., can correlate, in time, the first data of the first data stream output (e.g., stream source 108) with the second data of the second data stream output (e.g., stream source 110). In an example, stream aggregating component 112 can provide the first data stream output and the second data stream output (e.g., separately or in an aggregated stream) to stream correlating component 116. In this example, stream correlating component 116 can correlate the first data stream output and the second data stream output, and provide the correlated stream or aggregated streams to the stream aggregating component 112 for outputting to one or more applications 114, readers 122, or other components.

For example, in correlating at action 506, optionally at action 508, the first data stream output can be synchronized with the second data stream output. In an example, stream synchronizing component 118, e.g., in conjunction with processor 102, memory 104, stream server 106, etc., can synchronize the first data stream output and the second data stream output. For example, stream synchronizing component 118 can initialize the first data stream output and the second data stream output at similar times (e.g., in parallel, by specifying a similar starting time for starting the streams, etc.) such that the first data stream output and the second data stream output are synchronized from the start. In one example, stream synchronizing component 118 can start the stream sources 108, 110 by requesting data from a corresponding device (e.g., sensor device) at similar times. This can cause the devices to begin sending data at similar times, and continue sending the data substantially synchronized in time.

In another example, stream synchronizing component 118 can determine a difference between a first timestamp on the first data of the first data stream output and a second timestamp on the second data of the second data stream output. In this example, stream synchronizing component 118 can synchronize the first data stream output with the second data stream output based on determining that the timestamps are similar and/or within a threshold difference of one another. In one example, stream synchronizing component 118 can determine a threshold difference based on a difference in cadence, latency, etc. determined for the first data stream output and the second data stream output. In one example, stream synchronizing component 118 may provide an indication of the difference to one of the first stream source and/or the second stream source (e.g., to a firmware of the stream sources) to facilitate synchronizing the stream source to output data based on the difference. In this example, the stream source may receive the difference and adjust timing of sending the output to account for the difference (e.g., to send data at a current time or timestamp plus the difference).

In one example, stream synchronizing component 118 can genlock the first data stream output and the second data stream output based on timestamps and/or an offset between the timestamps and a time the first data and second data are received to maintain synchronization between the stream outputs. For example, the offset for each of the first data stream output and the second data stream output can be applied to each of the first data stream output and the second data stream output to synchronize data received from the data streams. In this example, stream synchronizing component 118 can output synchronized first data and second data to the stream aggregating component 112 for providing in a single stream output, as described above, or in separate output streams in another example. Also, in either case for example, application 114 and/or reader 122 can receive temporally correlated data from the multiple stream sources.

In another example, in correlating at action 506, optionally at action 510, data can be correlated based on determining that the first data and the second data correspond to a similar time interval. In an example, data matching component 120, e.g., in conjunction with processor 102, memory 104, stream server 106, etc., can correlate data based on determining that the first data and the second data correspond to a similar time interval. For example, data matching component 120 can match the first data and the second data based on a first timestamp associated with the first data and a second timestamp associated with the second data, a first duration associated with the first data and a second duration associated with the second data. In one example, data matching component 120 can correlate the first data and the second data based on determining that a first block of time defined by the first timestamp plus the first duration overlaps a second block of time defined by the second timestamp plus the second duration (e.g., by at least a threshold overlap time).

In one example, in correlating data at action 510, optionally at action 512, a candidate time for matching the first data with the second data can be selected. In an example, data matching component 120, e.g., in conjunction with processor 102, memory 104, stream server 106, etc., can select the candidate time for matching the first data with the second data. Data matching component 120 can select substantially any time as a candidate time, and the candidate time can be used to determine matching data. In one example, data matching component 120 can select a timestamp associated with each data stream output being correlated (e.g., a timestamp for data received from each data stream output). In another example, data matching component 120 can select a timestamp associated with the data stream output having a lowest cadence of the data stream outputs being correlated. This can ensure data is being correlated and generated in the output for all data stream outputs (e.g., as opposed to selecting a timestamp associated with a data stream output having a higher cadence, where data from the data stream output having the lower cadence may not be present at all candidate times). In another example, data matching component 120 may select a candidate time that is between times of a cadence for one of the data stream outputs.

In one example, data matching component 120 can determine whether, for the data stream output having the highest cadence, data is received for the data stream output within half of the cadence at the candidate time. In an example, data matching component 120 can determine a cadence for the data stream output based on one or more parameters specified for the data stream (e.g., a cadence indicated in attribute information for the data stream or related device). In another example, data matching component 120 can determine the cadence for the data stream based at least in part on determining an average interval at which data is received over the data stream output. In any case, where data matching component 120 determines that data, for the data stream output having the highest cadence, is not received within half of the average interval at the candidate time, data matching component 120 may determine that there is no match for the candidate time. Where data matching component 120 determines that data, for the data stream output having the highest cadence, is received, data matching component 120 may continue to determine whether data is received for the other (and/or one or more additional) data stream outputs within half of the cadence at the candidate time. If not, the data for the data stream output(s) can be dropped, and no correlation can be made between the data stream outputs for the candidate time. In one example, where data is received for all data stream outputs being correlated at the candidate time, data matching component 120 can determine that the data for the data stream outputs match for the purpose of correlating the data and generating one or more stream outputs at the candidate time.

In another example, with the candidate time selected, in correlating the data at action 510, optionally at action 514, it can be determined that the first data and the second data have the lowest spread with respect to the candidate time. In an example, data matching component 120, e.g., in conjunction with processor 102, memory 104, stream server 106, etc., can determine that the first data and the second data have the lowest spread with respect to the candidate time. For example, data matching component 120 can determine that the first data and second data (and/or additional data of additional data stream outputs) have the lowest spread with respect to the candidate time (e.g., as compared to other first data, second data, and/or additional data received at different times in the first data stream output, the second data stream output and/or additional data stream outputs), which can include determining the first data and second data (e.g., and/or additional data), when considered together, have the lowest total or average difference from the candidate time than other combinations of other data from the first data stream output, the second data stream output, and/or additional data stream outputs. In another example, this can include determining that the first data and the second data (and/or additional data) have the lowest standard deviation from the candidate time. In yet another example, this can include determining that the first data has the lowest difference from the candidate time, and the second data (and/or additional data) has the lowest difference or standard deviation from the time of the first data, etc.

For example, referring to FIG. 3, data matching component 120 may determine, for mux sample 316, that data from Pin0 302, Pin1 304, and Pin2 306 are correlated based on associated timestamps, and difference or standard deviation of the timestamps with respect to a candidate time. For example, data matching component 120 can determine that the data from each Pin is the closest data for that Pin to the candidate time and/or is at least within a threshold difference of the candidate time. Data matching component 120 may additionally receive data from Pin1 304 and Pin2 306 around 16 ms later, but may not receive data from Pin0 302 at or around that time (e.g., because data is received on Pin0 302 at a lower cadence). Thus, corresponding output data for any stream outputs that include data from Pin0 302 can be dropped at this time, and only mux sample 6 320 is provided on its corresponding stream output. In another example, one or more Pins may not receive data for other reasons, such as data not being received in a certain interval, data being corrupted in the interval, etc., and the data matching component 120 may drop data received from other Pins at a candidate time where data is not received over all Pins correlated in a given stream output.

Referring to FIG. 5, in method 500, at action 516, a single stream output may be optionally generated including one or more output frames where at least one output frame includes first data from the first data stream output and second data from the second data stream output. In an example, stream aggregating component 112, e.g., in conjunction with processor 102, memory 104, stream server 106, etc., can generate the single stream output including one or more output frames where at least one output frame includes first data from the first data stream output and second data from the second data stream output, which can be based on the correlated data received from stream correlating component 116. As described, for example, stream aggregating component 112 may generate the single stream output to include the first data and second data in different containers of an output frame, where an interface can be utilized to obtain the data from the respective containers (e.g., by an application 114, reader 122, a stream augmenting component, or other component, etc.).

In method 500, at action 518, one or more output frames having the first data and second data can be output. In an example, stream aggregating component 112, e.g., in conjunction with processor 102, memory 104, stream server 106, etc., can output the one or more output frames having the first data and the second data (e.g., to an application 114, reader 122, a stream augmenting component, or other component, etc., via an interface). For example, outputting the one or more output frames can include outputting the frames in the single stream output optionally generated at action 516 and/or in separate stream outputs corresponding to the stream sources. In either case, the output frames include data from the first stream source and the second stream source as correlated in time. In a specific example, where the stream sources correspond to an RGB camera and depth camera, the frames from the sources can be temporally correlated in this regard so that the frames provided in the stream output can be associated with a similar physical time at which the frames were captured to improve coherency of the stream output.

Figure 6:
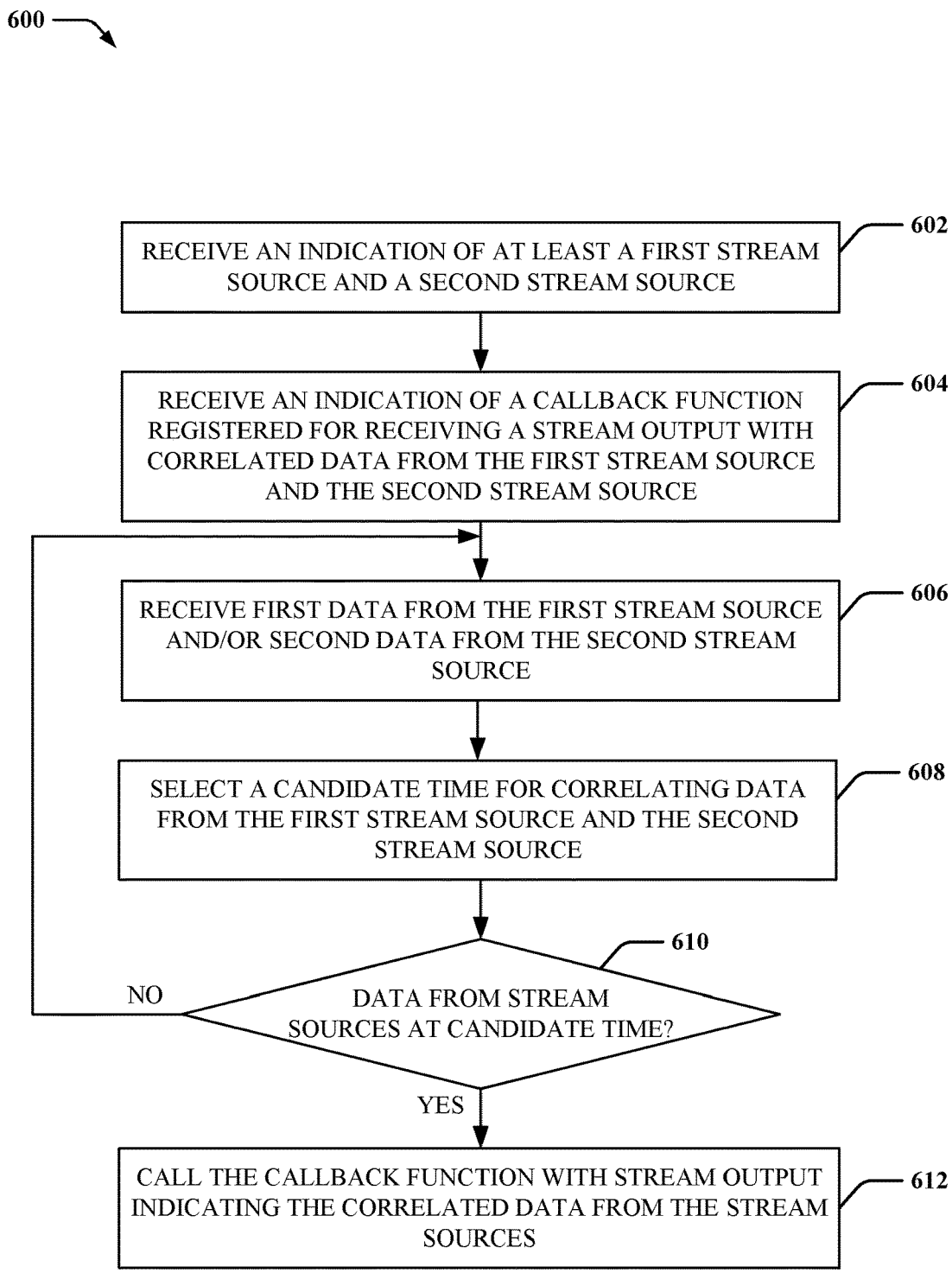
FIG. 6 is a flow diagram of an example of a method for implementing temporal correlation for multiplexed data from a plurality of stream sources using a callback function.

FIG. 6 is a flowchart of an example of a method 600 for generating a single stream output with data from multiple correlated stream sources. For example, method 600 can be performed by a device 100 and/or one or more component thereof to facilitate correlating data from multiple stream sources.

In method 600, at action 602, an indication of at least a first stream source and a second stream source can be received. In an example, stream correlating component 116, e.g., in conjunction with processor 102, memory 104, stream server 106, stream aggregating component 112, etc., can receive an indication of at least a first stream source (e.g., stream source 108) and a second stream source (e.g., stream source 110). For example, stream aggregating component 112 may indicate the first and second stream sources to the stream correlating component 116 for correlating data therefrom. In an example, stream aggregating component 112 can additionally receive an indication of the stream sources based on initializing the stream sources (e.g., stream sources 108, 110), which may be based on discovering the stream sources, receiving an indication (e.g., from an application 114, reader 122, one or more stream augmenting components, etc.) to obtain and aggregate data from the stream sources, and/or the like. In any case, stream correlating component 116 can receive the indication of two or more stream sources of the device 100 for correlating data to a given stream output. In an example, stream correlating component 116 can receive multiple indications for correlating data from different stream sources and/or different combinations of stream sources.

In method 600, at action 604, an indication of a callback function registered for receiving a stream output with correlated data from the first stream source and the second stream source can be received. In an example, stream correlating component 116, e.g., in conjunction with processor 102, memory 104, stream server 106, stream aggregating component 112, etc., can receive the indication of the callback function registered for receiving a stream output with correlated data from the first stream source and the second stream source. For example, stream aggregating component 112, which can determine to obtain correlated data for the first stream source and second stream source for aggregating to a single stream output, can provide the indication of the callback function to stream correlating component 116 along with the indication of the stream sources, such that stream correlating component 116 can call the callback function with a single stream output including correlated data from the stream sources.

In method 600, at action 606, first data from the first stream source and/or second data from the second stream source can be received. In an example, stream correlating component 116, e.g., in conjunction with processor 102, memory 104, stream server 106, stream aggregating component 112, etc., can receive first data from the first stream source and/or second data from the second stream source. In an example, stream correlating component 116 can receive the data from the stream sources from stream aggregating component 112, directly from the stream sources (e.g., stream sources 108, 110), etc. As described, in an example, stream correlating component 116 can receive the first data from the first stream source and the second data from the second stream source at different times, different cadences, etc. Thus, stream correlating component 116 can attempt to correlate data that are received from the stream sources around a similar time (e.g., a candidate time), and may, in an example, drop data from one of the stream sources that cannot be correlated in time with data from other stream sources.

Moreover, in an example, stream correlating component 116 can store the received first data and second data in one or more queues corresponding to the first stream source and the second stream source (e.g., in memory 104). For example, as described, the stream sources may have differing cadences, latencies, etc., and the latencies may change over time. Similarly, for example, as the stream sources are different and may be based on different clocks, the first stream source and the second stream source may drift apart in time, then drift closer together, and so on. In an example, stream correlating component 116 can store data received from the first stream source (e.g., stream source 108) and/or the second stream source (e.g., stream source 110) in respective queues in memory 104 to facilitate correlating the data based on a timestamp (e.g., as opposed to a time the data is received from the stream source). This can facilitate removing jitter, mitigating clock drift, etc. in correlating the data. Furthermore, for example, stream correlating component 116 can store additional information for the stream sources, such as a source index, a memory pointer to the stream source, a queue of data added for the stream source (e.g., a number of frames or samples of data received for the stream source at different times, which may also have one or more associated timestamps), a number of data frames or samples added for the stream source, a time of the last data added (e.g., a timestamp of the last data, a system time when the data is received from the stream source, etc.), a predicted time of receiving next data from the stream source, the last number of intervals for data added from the stream source, the average of the last number of intervals, the last latency in receiving data from the stream source, the average of a last number of latencies for receiving data from the stream source, etc.

In one example, stream correlating component 116 can ensure the received first data and/or second data are valid for attempting correlation before attempting to perform the correlation. For example, stream correlating component 116 can calculate an interval time since last data was received from the stream source and store the interval in an array of intervals for the stream source, store a last time at which the last data was received from the stream source, and increment a data count. Stream correlating component 116, in this example, can calculate the average interval from a window of recent intervals. If the average interval is valid (e.g., within a range of the determined cadence of the stream source), stream correlating component 116 can determine whether a time for receiving data from the stream source is greater than a time predicted based on the average interval and the last time at which the last data was received, and if so can log missed data and advance the predicted time by the average interval. If not, stream correlating component 116 can set the predicted time for the next data to the timestamp of the received data plus the average interval. Moreover, for example, stream correlating component 116 may drop data if any stream source to be correlated does not have an average interval. If all stream sources to be correlated have data and an average interval, stream correlating component 116 can attempt to correlate data from the stream sources.

In method 600, at action 608, a candidate time can be selected for correlating data from the first stream source and the second stream source. In an example, stream correlating component 116, e.g., in conjunction with processor 102, memory 104, stream server 106, stream aggregating component 112, etc., can select the candidate time for correlating data from the first stream source and the second stream source. For example, stream correlating component 116 can select the candidate time based on a cadence related to one or more of the stream sources, such as the time data is received on each stream source, a time data is received on a stream source having the lowest cadence (e.g., as data from the higher cadenced stream sources that cannot be correlated to data from the lowest cadenced stream source may be dropped anyway). In addition, stream correlating component 116 can select the candidate time at or near an expected time for receiving data from the stream source (e.g., based on determining the cadence as an attribute specified in a configuration for the stream source, based on a determined interval at which data is received over the stream source, etc.). In another example, stream correlating component 116 can select the candidate time between expected times for receiving data from the stream source (e.g., based on the determined or observed cadence). In addition, the candidate time can be selected at each interval based on the cadence of the stream source having the lowest cadence to attempt to correlate data of the stream source having the lowest cadence with data received at a similar time from one or more other stream sources. Moreover, for example, stream correlating component 116 can drop data received from the one or more other stream sources between intervals of the lowest cadence stream source.

In method 600, at action 610, it can be determined whether there is data from the stream sources at the candidate time. In an example, stream correlating component 116, e.g., in conjunction with processor 102, memory 104, stream server 106, stream aggregating component 112, etc., can determine whether there is data from the stream sources at the candidate time. For example, stream correlating component 116 can determine whether there is data from all stream sources to be correlated (e.g., the first stream source, the second stream source and/or other stream sources) at, or within a threshold time of, the candidate time. In another example, stream correlating component 116 can determine whether there is data from at least one or more primary stream sources for which receiving data may be required to generate the stream output of the data. In this example, stream correlating component 116 may define other stream sources as secondary stream sources where data is correlated if correlation can be made, but if not, data from the primary stream sources can be correlated and used to generate the stream output.

In one example, stream correlating component 116, in determining whether there is data from the stream sources at the candidate time, can utilize data matching component 120 to determine whether data from the stream sources can be correlated based on the candidate time. In one example, data matching component 120 can determine to correlate data from the stream sources based on the timestamp on the data. For example, data matching component 120 can determine whether data exists for the first stream source having the lower cadence at the candidate time, and then can determine whether data exists for the second stream source at or near the candidate time, which may be based on determining that data is received at an or near (e.g. within one half of an interval associated with the determined cadence of the stream source) the expected interval determined to be correlated with the candidate time. Moreover, in an example, data matching component 120 can determine whether a next expected data from the higher cadenced stream source(s) would be closer to the candidate time, and if so, may wait for the data before performing the correlation. As described, for example, the data received from the stream sources may not be the closest in time to one another, but may have the least spread (e.g., combined difference) from the candidate time.

In any case, where stream correlating component 116 determines that there is not data from stream sources (e.g., all stream sources or at least primary stream sources) at the candidate time, method 600 can return to action 606 to receive additional first data from the first stream source and second data from the second stream source. Where stream correlating component 116 determines that there is data from stream sources (e.g., all stream sources or at least primary stream sources) at the candidate time, at action 612, the callback function can be called with stream output indicating the correlated data from the stream sources. In an example, stream correlating component 116, e.g., in conjunction with processor 102, memory 104, stream server 106, stream aggregating component 112, etc., can call the callback function (e.g., registered by the stream aggregating component 112) with stream output indicating the correlated data from the stream sources. For example, stream correlating component 116 can include, in calling the callback function, an indication of the data to be correlated from the stream sources (e.g., the first stream source, the second stream source, and/or other stream sources), a memory location of the data to be correlated, etc. In another example, stream correlating component 116 can include, in calling the callback function, the data correlated in a single stream output (e.g., where the data may be in corresponding containers, as described with respect to FIG. 2), etc. In any case, stream aggregating component 112 can output one or more stream outputs with the correlated data as received in the callback function, as described above.

Figure 7:
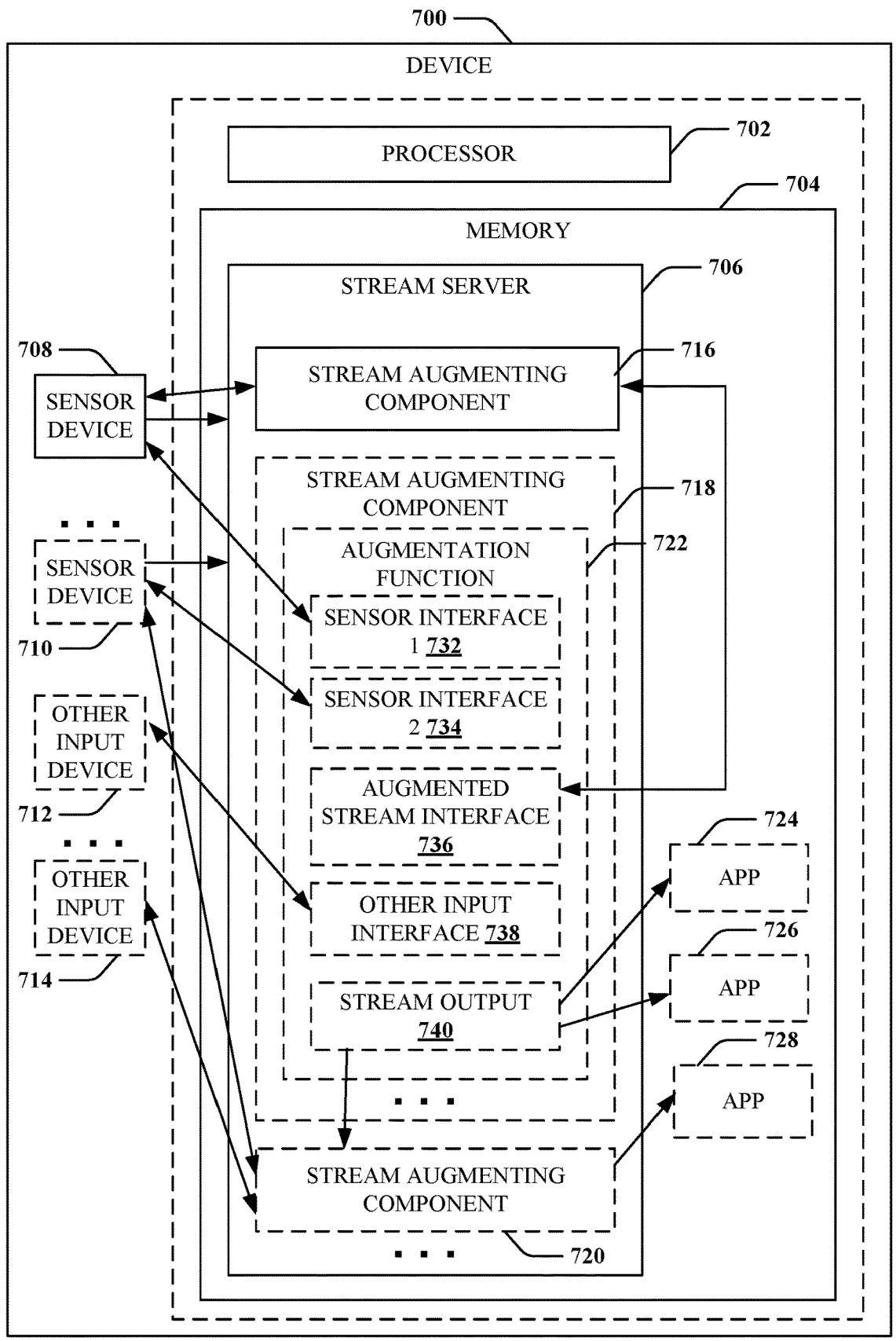
FIG. 7 is a schematic diagram of an example of a device for implementing one or more stream augmenting components.

FIG. 7 is a schematic diagram of an example of a device 700 that can implement a stream server for facilitating operating one or more sensor devices, other input devices, etc., which can be based on using one or more pluggable stream augmenting components. For example, device 700 may be similar to device 100, and may thus include a processor 702 (e.g., similar to processor 102) and a memory 704 (e.g., similar to memory 104), which may be configured to execute a stream server 706 (e.g., similar to stream server 106), one or more applications 724, 726, 728 (e.g., similar to application 114), etc.

Device 700 can also include one or more sensor devices 708, 710 for obtaining input (e.g., video input, audio input, biometric input or other input that can be obtained in frames of data, etc.) and outputting a corresponding output stream of data. For example, the one or more sensor devices 708, 710 can include a camera (e.g., a RGB camera, IR camera, depth camera, etc.), which may be video cameras, still image cameras, etc., an eye scan or eye tracking sensor, a fingerprint or touch sensor, a microphone, etc. Device 700 may optionally also include one or more other input devices 712, 714, which may provide additional input data upon request and/or detected events, such as a location device (e.g., a global positioning system (GPS) receiver), a gyroscope, etc. For example, the sensor devices 708, 710, and/or other input devices 712, 714, can be communicatively coupled to the computing device via substantially any wired or wireless interface (e.g., universal serial bus (USB), Firewire, local area network (LAN), wireless LAN (WLAN), Bluetooth, radio frequency identification (RFID), near field communication (NFC), etc.).

In an example, stream server 706 can obtain output streams (e.g., streams of framed data) of sensor devices 708, 710 for exposing as an input to one or more applications, or to one or more stream augmenting components 716, 718, 720, etc., for consumption thereof. Framed data, for example, can correspond to data from the sensor devices 708, 710 that is output according to a cadence. In one example, the framed data can correspond to the data as captured according to the cadence (e.g., frames per second for a camera). In addition, stream server 706 can include one or more stream augmenting components 716, 718, 720 that can define one or more augmentation functions, such as augmentation function 722, for obtaining data from the one or more sensor devices 708, 710, one or more input devices 712, 714, etc., correlating and/or modifying the data, and outputting the data in an augmented output stream for use by one or more applications 724, 726, 728 or other stream augmenting components 716, 718, 720 or corresponding augmentation functions. The stream output 740 may also output framed data, and the data and/or framing parameters (e.g., cadence) may be the same as or modified from the data and/or framing parameters as received from the sensor devices 708, 710, other input devices 712, 714, and/or other augmentation functions, etc. In an example, the one or more sensor device 708, 710, other input devices 712, 714, and/or stream augmenting components 716, 718, 720, to the extent they output data streams of cadenced framed data, may correspond to stream sources 108, 110, as described in FIG. 1.

In a specific example, stream augmenting component 718 can define augmentation function 722, which can be defined to include sensor interface 1 732 to sensor device 708, sensor interface 2 734 to sensor device 710, augmented stream interface 736 to stream augmenting component 716 (e.g., to an augmentation function thereof), other input interface 738 to other input device 712, and a stream output 740 for outputting a stream with data from the various interfaces 732, 734, 736, 738 to one or more applications 724, 726 (and/or to one or more other stream segmenting components 720). For example, the interfaces 732, 734, 736, 738 can correspond to an interface to at least one of receive (e.g., request) an output stream from, or control functionality of, sensor device 708, sensor device 710, stream augmenting component 716 (or a specific augmentation function thereof), other input device 712, etc. Stream augmenting component 718, as shown in FIG. 7, is one specific example of a stream augmenting component, and other stream augmenting components may implement other augmentation functions that utilize other inputs from other sensor devices, other input devices, and/or other stream augmenting components, provide control for such components and/or devices, and/or provide stream outputs. For example, stream augmenting component 716 may include at least one augmentation function that interfaces with sensor device 708 and provides an output stream, which is consumed by augmented stream interface 736. Additionally, for example, stream augmenting component 720 may interface with sensor device 710, other input device 714, and stream augmenting component 718 (e.g., to receive stream output 740), and may provide stream output, which may be consumed by application 728.

In one example, stream augmenting component 718 may include a configuration that advertises the various interfaces 732, 734, 736, 738 and stream output 740 for each augmentation function 722 provided by the stream augmenting component 718. In one example, the configuration may indicate, for one or more interfaces 732, 734, 736, 738, one or more requested functions for obtaining stream data from the corresponding device or stream augmenting component, one or more requested functions for controlling the corresponding device or stream augmenting component, etc. Accordingly, stream server 706 can determine augmentation functions for which the requested functions are available, and can activate at least a portion of these augmentation functions for use by other stream augmentation components, applications, etc., which may include additionally exposing corresponding callable functions of the augmentation functions (e.g., to obtain a stream output thereof, to control one or more aspects of the augmentation functions, etc.). In an example, controlling functionality of the devices may include activating or powering on the devices, providing one or more parameters for operating the devices, etc., as described further in examples herein.

For example, stream server 706 can determine to activate the augmentation function 722, and/or associated stream augmenting component 718, such to expose one or more interfaces defined by augmentation function 722 for obtaining stream output 740, where the determination to activate can be based on determining: (1) that sensor devices 708, 710 are available and exposing functions requested by the augmentation function 722 for sensor interface 1 732 and sensor interface 2 734 (e.g., as specified in an associated configuration) to obtain stream output or control the devices; (2) that other input device 712 is available and exposing functions requested by the augmentation function 722 for other input interface 738 (e.g., as specified in the associated configuration) to facilitate querying and/or receiving relevant data or controlling the other input device 712; and/or (3) that stream augmenting component 716 is available and exposing functions requested by the augmentation function 722 for augmented stream interface 736 (e.g., as specified in the associated configuration) for outputting the augmented stream or allowing control of stream augmenting component 716. For example, in this regard, stream server 706 can initially activate stream augmenting component 716 (or an augmentation function thereof) based on determining sensor device 708 is available and exposing functions requested by the stream augmenting component 716, and then may activate augmentation function 722 based at least in part on activating the stream augmenting component 718. Moreover, in this regard, stream server 706 can activate stream augmenting component 720 (or an augmentation function thereof) based on activating augmentation function 722 to output stream output 742, which can be an input to the augmentation function of stream augmenting component 720 (e.g., in addition to determining that sensor device 710 and other input device 714 are available and exposing requested functions).

In some examples, one or more augmentation functions of the stream augmenting components 716, 718, and/or 720 may not be activated or exposed where one or more corresponding interfaces are not available (e.g., because one of the requested functions of a corresponding device or stream augmenting component is not available). Additionally, the stream augmenting components 716 can be organized and exposed in a hierarchy, such that an application 724, 726, 728 and/or higher level stream augmenting components can access outputs of a next lower level stream augmenting component (e.g., applications 724 and 726 can access stream output 740 of stream augmenting component 718 as exposed by stream augmenting component 720). Accordingly, stream augmenting component 720 may hide some or all stream outputs of stream augmenting component 718 from applications 724, 726, 728. In addition, for example, stream server 706 can expose interfaces to the sensor devices 708, 710, other input devices 712, 714, etc. without stream augmenting components, or may allow access to these devices only through available stream augmenting components. In an example, device 700 can include a reader 122, as described with respect to device 100, that can expose an interface for querying stream output 740 (or other stream outputs from other stream augmenting components) for certain associated data.

In an example, once activated, an augmentation function of a stream augmenting component can receive data streams and/or requested data from the various inputs, control one or more devices to obtain the data streams and/or requested data, etc., and can modify, correlate, or otherwise use the various data to produce stream output. For example, augmentation function 722 can obtain an output stream from sensor device 708 via sensor interface 1 732 (and/or may control sensor device 708 via the interface), obtain an output stream from sensor device 710 via sensor interface 2 734 (and/or may control sensor device 710 via the interface), obtain an output stream from an augmentation function of stream augmenting component 716 via augmented stream interface 736 (and/or may control the augmentation function via the interface), and obtain other input data from other input device 712 via other input interface 738 (e.g., based on request/response, receiving data based on a subscription or event-driven delivery, etc.). In this example, the augmentation function 722 can modify, correlate, or otherwise use the stream data or other input data in producing at least one stream output 742. In one example, stream augmenting component 718 may include a stream aggregating component 112 for aggregating data from sensor interface 1 732, sensor interface 2 734, augmented stream interface 736, other input interface 738, etc., and/or may include a stream correlating component 116 for temporally correlating the aggregated data for the stream output 740, as described above.

In a specific example, sensor device 708 may be a RGB camera, sensor device 710 may be a depth camera, stream augmenting component 716 may output a lens corrected stream from the RGB camera, and the other input device 712 may be a gyroscope. In this example, stream augmenting component 718 may obtain depth information for one or more objects via sensor interface 2 734, use the depth information to set a depth of the RGB camera via sensor interface 1 732, receive images from the RGB camera as lens corrected and output from stream augmenting component 716, and correlate the lens corrected images with position data from the gyroscope to produce stream output 742. Thus, for example, stream output 742 may include framed data provided at a cadence, where each frame includes a lens corrected image and at least some frames include gyroscope position information (e.g., in frames where the gyroscope provides a position change notification via sensor interface 2 734). Accordingly, application 724, 726, and/or stream augmenting component 720 can receive the stream output 740 (e.g., as frames sent according to the cadence, where the cadence can correspond to a cadence of the stream augmenting component 716 output), and can utilize the stream output 740 to create larger depth-focused panoramic images using the images obtained from the stream output 740 and the corresponding position information to place the images relative to one another in creating the larger images. This is a specific example, and many other examples can utilize stream augmenting components to provide more or less complex modifications of stream outputs.

Figure 8:
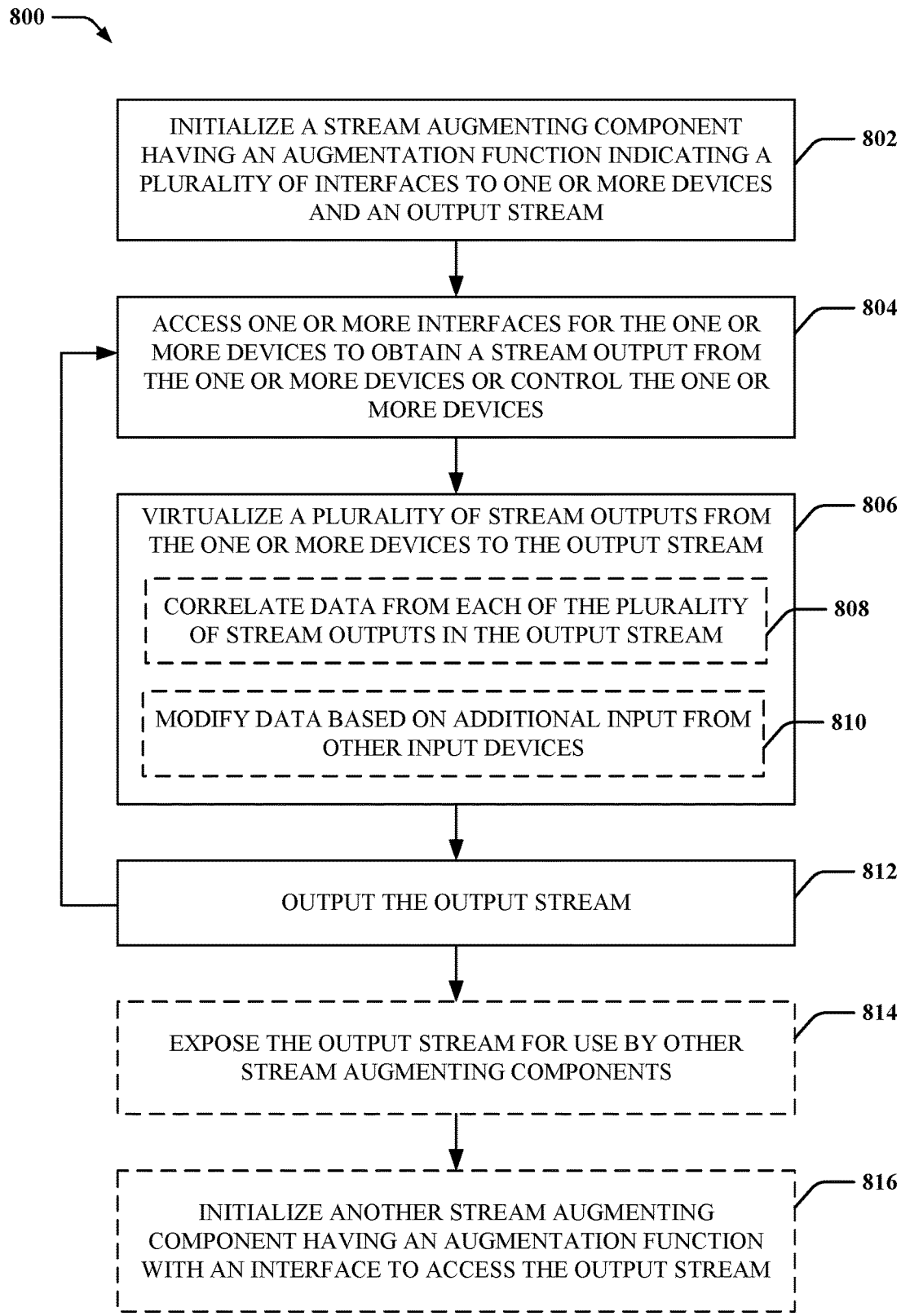
FIG. 8 is a flow diagram of an example of a method for initializing one or more stream augmenting components.

FIG. 8 is a flowchart of an example of a method 800 for initializing and utilizing a stream augmenting component for interfacing with multiple input devices or other stream augmenting components to generate an output stream for consumption by an application or other stream augmenting component. For example, method 800 can be performed by a device 700 and/or one or more components thereof to facilitate executing one or more pluggable stream augmenting components.

In method 800, at action 802, a stream augmenting component, having an augmentation function indicating a plurality of interfaces to one or more devices and an output stream, can be initialized. In an example, stream server 706, e.g., in conjunction with processor 702, memory 704, etc., can initialize a stream augmenting component 716, 718, 720, having an augmentation function 722 indicating a plurality of interfaces to one or more devices (e.g., sensor interface 1 732, sensor interface 2 734, augmented stream interface 736, other input interface 738, etc.) and an output stream (e.g., stream output 740). In an example, the stream augmenting component 718 can advertise one or more augmentation functions, including augmentation function 722, associated interfaces (e.g., interfaces 732, 734, 736, 738 for augmentation function 722), and/or associated outputs (e.g., stream output 740). For example, stream augmenting component 718 can advertise a configuration for the one or more augmentation functions that indicates the various interfaces and corresponding outputs.

In an example, advertising the configuration may be part of registering the stream augmenting component 718 and/or related augmentation functions (e.g., augmentation function 722) with the stream server 706. In one example, the stream augmenting components 716, 718, 720 and/or related configurations can be specified in a driver package for an operating system executing the stream server 706 (on device 700), and registration and/or initialization of the stream augmenting components 716, 718, 720 can occur based on an initialization of drivers by the operating system, an initialization of the stream server 706 on device 700, etc. In one example, when the stream augmenting component 716, 718, 720 is registered and/or initialized, as described, an output stream associated therewith (and/or possibly one or more interfaces for receiving the output stream or for modifying the augmentation functions of the stream augmenting component) can be exposed for registering and/or initializing other stream augmenting components that may use the output stream (or interface). In an example, stream server 706 can utilize the configuration describing each stream augmenting component to determine augmentation functions for which stream augmenting components can be initialized based on whether specific interfaces are available, and can accordingly initialize each available augmentation function.

In this regard, as described, it is possible that some augmentation functions and/or corresponding stream augmenting components are not initialized based on certain output streams or related interfaces to access the output streams or otherwise modify certain devices, augmentation functions, etc. not being available. This can allow the components to be pluggable such to operate with all, some, or no available augmentation functions based on availability of device interfaces, other augmentation functions of other stream augmenting components, etc. where available augmentation functions or related interfaces can be exposed for use.

In method 800, at action 804, one or more interfaces for the one or more devices can be accessed to obtain a stream output from the one or more devices or control the one or more devices. In an aspect, interfaces 732, 734, 736, 738, etc., e.g., in conjunction with stream server 706, processor 702, memory 704, etc., can access one or more interfaces for the one or more devices to obtain a stream output from the one or more devices or control the one or more devices. For example, interfaces 732, 734 can obtain an output stream from sensor devices 708, 710, or can control the sensor devices 708, 710, which may be based on output streams from the devices and/or other devices (e.g., controlling depth for focusing an RGB camera based on depth information in an output stream from a depth camera). In this example, sensor device 708 may expose one or more interfaces for obtaining stream output therefrom or controlling one or more aspects thereof, and sensor interface 1 732, based on instructions defined for the augmentation function 722, can utilize the one or more interfaces to obtain the stream output or control the sensor device 708. Similarly, sensor device 710 may expose one or more interfaces for obtaining stream output therefrom or controlling one or more aspects thereof, and sensor interface 2 734, based on instructions defined for the augmentation function 722, can utilize the one or more interfaces to obtain the stream output or control the sensor device 710. Also, in an example, stream augmenting component 716 may expose one or more interfaces for obtaining stream output therefrom (e.g., from an augmentation function thereof) or controlling one or more aspects of the stream augmenting component 716 (e.g., of an augmentation function thereof), and augmented stream interface 736, based on instructions defined for the augmentation function 722, can utilize the one or more interfaces to obtain the stream output or control the stream augmenting component 716 (e.g., or an augmentation function thereof).

In one example, augmentation function 722 can access one or more interfaces for one or more devices for controlling the one or more devices based on accessing one or more interfaces to obtain the stream output from the one or more devices. For example, augmentation function 722 can access the one or more interfaces to activate, modify one or more operation parameters, etc. for one or more devices based on receiving stream output from one or more other devices. In a specific example, augmentation function 722 can activate sensor device 708 via sensor interface 1 732 based on receiving data from sensor device 710 via sensor interface 734, modify an operating parameters of sensor device 708 via sensor interface 1 732, such as a time offset, based on receiving data from sensor device 710 via sensor interface 2 734, etc.

In method 800, at action 806, a plurality of stream outputs from the one or more devices can be virtualized to the output stream. In an aspect, augmentation function 722, e.g., in conjunction with stream server 706, processor 702, memory 704, etc., can virtualize the plurality of stream outputs from the one or more devices to the output stream. In one example, augmentation function 722 can virtualize stream outputs from sensor device 708 (via sensor interface 1 732), sensor device 710 (via sensor interface 2 734), and stream augmenting component 716 output (via augmented stream interface 736) into the output stream (e.g., stream output 740). In one example, augmentation function 722 can generate the single output stream with aggregated data and/or based on further modification and/or correlation of the stream outputs based on the augmentation function 722.

In one example, augmentation function 722 can aggregate data from the various sensor devices 708, 710, stream augmenting components 716, etc. into the single output stream, and thus stream output 740 can output data as it is received from the sensor devices 708, 710, stream augmenting component 716, etc. As described, for example, this may include utilizing a stream aggregating component 112 to aggregate the data from the multiple stream sources (e.g., sensor devices 708, 710, stream augmenting components 716, etc.) into the single stream output 740. For example, the single output stream may output framed data where each frame may have a container for data of a specific type (e.g., of a specific device, as modified by the augmentation function 722, etc.), where a receiving application or stream augmenting component can access the containers to obtain the data in the single output stream. In another example, in virtualizing the plurality of stream outputs, optionally at action 208, data from each of the plurality of stream outputs can be correlated in single output stream. In an aspect, augmentation function 722, e.g., in conjunction with stream server 706, processor 702, memory 704, etc. can correlate the data from each of the plurality of stream outputs into the output stream (e.g., stream output 740). In an example, augmentation function 722 can utilize many different types of correlation functions, such as a spatial correlation function, a temporal correlation function, etc. to correlate data received from the plurality of stream outputs to the output stream.

For example, augmentation function 722 can implement temporal correlation to correlate output streams of sensor devices 708, 710 based on a time related to framed data received in the output streams (e.g., based on a timestamp associated with the framed data), and can deliver temporally correlated framed data from both sensor devices 708, 710 (e.g., based on determining framed data from the sensor devices 708, 710 having similar timestamps) to the output stream. As described, for example, this may include utilizing a stream correlating component 116 to temporally correlate the data from the multiple stream sources (e.g., sensor devices 708, 710, stream augmenting components 716, etc.) into the single stream output 740 (which may include correlation based on a timestamp and/or duration, dropping data that cannot be correlated, etc., as described).

In another example, augmentation function 722 can implement a spatial correlation to correlate output streams of sensor devices 708, 710 based on other data, such as position from a gyroscope, location from a GPS receiver, etc. For example, augmentation function 722 can correlate framed data from sensor devices 708, 710 based on determining that the frames are associated with similar spatial data, which may be obtained from other input sources. In another example, augmentation function 722 may spatially correlate the stream output of framed data from sensor devices 708, 710 to expose data from the sensor devices 708, 710 at a time when input data from a microphone achieves a volume level threshold (e.g., stream camera frames when there is sufficient audio activity).

Thus, for example, in virtualizing the plurality of stream outputs, optionally at action 810, data can be modified based on additional input from other input devices. In an aspect, augmentation function 722, e.g., in conjunction with stream server 706, processor 702, memory 704, etc., can modify the data based on additional input from other input devices. In another example, augmentation function 722 can modify the data based on adding metadata from other input devices (e.g., position data from a gyroscope, location data from a GPS, etc.) to framed data in stream output 740. In an example, other input device 712 may expose one or more interfaces for obtaining output therefrom or controlling one or more aspects thereof, and other input interface 736, based on instructions defined for the augmentation function 722, can utilize the one or more interfaces to obtain the output or control the other input device 712.

In method 800, at action 812, the output stream can be output. In an aspect, augmentation function 722, e.g., in conjunction with stream server 706, processor 702, memory 704, etc., can output the output stream (e.g., as stream output 740). For example, augmentation function 722 can output the output stream to an interface for consumption by (or delivery to) one or more applications 724, 726, other stream augmenting components 720, etc. In an example, augmentation function 722 can output the output stream as framed data transmitted at a cadence, which may include correlated stream outputs from various sensor devices, additional data from other input devices, etc., as described. In one example, augmentation function 722 can output the output stream at a cadence similar to that of one or more of sensor devices 708, 710, a cadence of the faster or slower of sensor devices 708, 710, a least common cadence of sensor devices 708, 710, a different defined cadence, etc. In an example, augmentation function 722 can also indicate one or more parameters regarding the stream output 740 (e.g., in the configuration), such as cadence, frame size or length, etc. For example, an application 724, 726, another stream augmenting component 720, etc. can obtain and utilize the stream output 740. In an example, augmentation function 722 can output the output stream based on a certain file or output type, as a multiplexed stream of the output streams allowing for separating certain parts of the multiplexed stream (e.g., by one or more applications or other stream augmenting components consuming the output stream), etc. Moreover, for example, the stream output 740 can be output to a reader 122 for building an output for one or more applications 724, 726, based on a query for certain data in the stream output 740, as described.

In method 800, optionally at action 814, the output stream can be exposed for use by other stream augmenting components. In an aspect, stream server 706, e.g., in conjunction with processor 702, memory 704, etc., can expose the output stream (e.g., stream output 740) for use by other stream augmenting components (e.g., stream augmenting component 720). For example, stream server 706 can expose the output stream in a configuration accessible by the other stream augmenting components to allow the stream augmenting components to consume and/or modify the output stream. In another example, the other stream augmenting components can be initialized based on initialization of stream augmenting component 718, and exposing the output stream to the other stream augmenting components can be based on initializing and/or executing the other stream augmenting components. In an example described further herein, stream server 706 can expose the output stream as a multiplexed stream having framed data sent for each of a plurality of frames (e.g., according to a cadence) for each sensor device 708, 710, and having a container for each data (e.g., a container specific to a given sensor device 708, 710) that can be accessed via a context.

As described, the stream augmenting component 718 can facilitate hiding some functions or interfaces to the devices and/or other stream augmenting components. In this example, stream augmenting component 718 can expose output streams (e.g., stream output 740) that are different from those provided via interfaces 732, 734, 736, 738. In a specific example, stream augmenting component 716 may be provided by a hardware vendor of sensor device 708, and may expose a lens corrected output stream. Stream augmenting component 718 can obtain the lens corrected output stream via augmented stream interface 736 and use this output stream in generating the stream output 740, but may not expose an output stream corresponding to the lens corrected output stream as received from the stream augmenting component 716 or the raw data output stream from the sensor device 708. In this regard, stream augmenting components (e.g., stream augmenting component 720) leveraging stream output 740 from augmentation function 722 may only be able to access output streams via interfaces exposed by stream augmenting component 718.

In this regard, in method 800, optionally at action 816, another stream augmenting component having an augmentation function with an interface to access the output stream can be initialized. In an aspect, stream server 706, e.g., in conjunction with processor 702, memory 704, etc., can initialize another stream augmenting component (e.g., stream augmenting component 720) having an augmentation function with an interface to access the output stream. This other stream augmenting component can obtain data from the stream output 740 and modify the data for outputting in another stream output.

Figure 9:
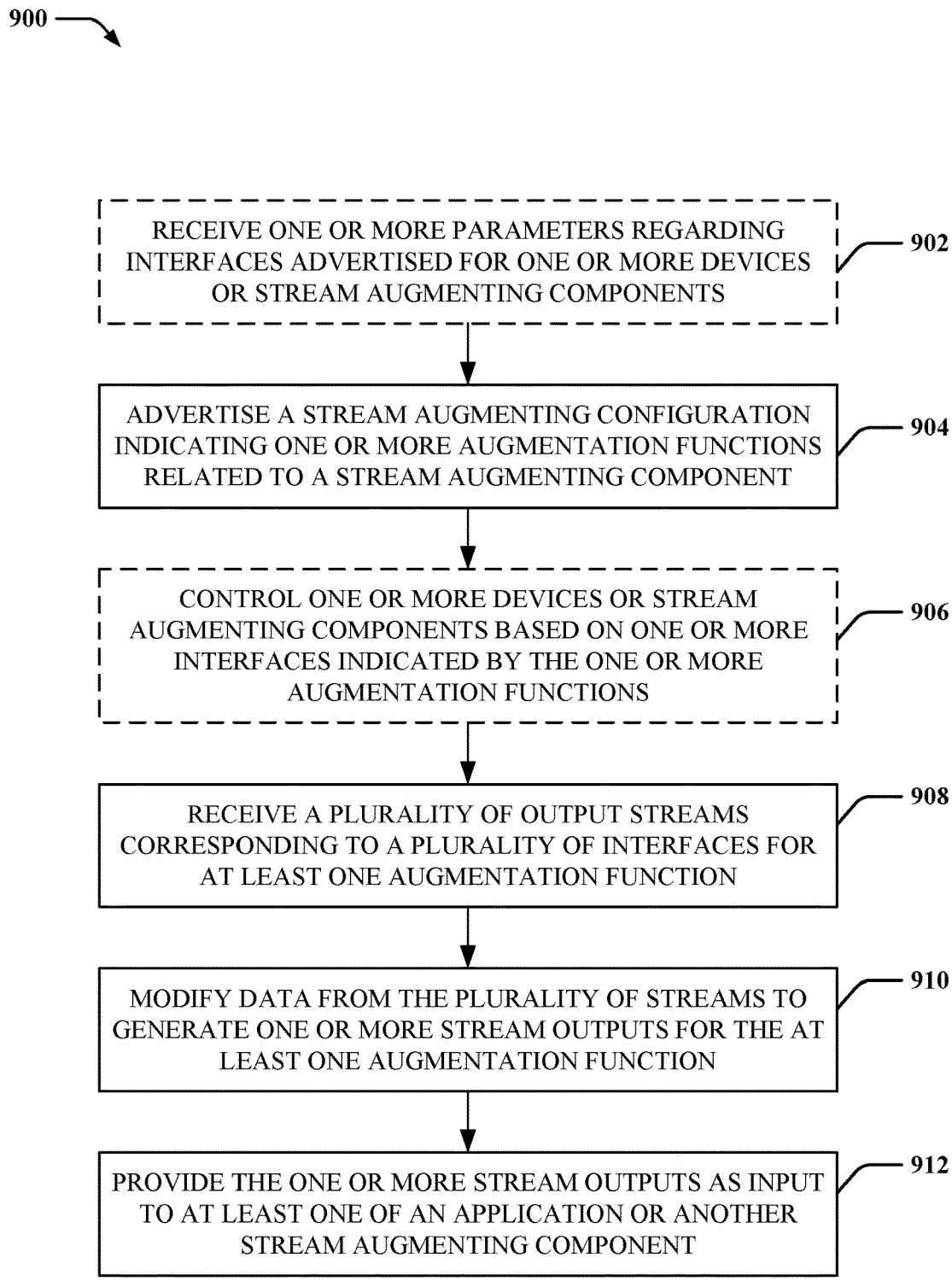
FIG. 9 is a flow diagram of an example of a method for providing one or more stream augmenting components.

FIG. 9 is a flowchart of an example of a method 900 for providing a stream augmenting component for interfacing with multiple input devices or other stream augmenting components to generate an output stream for consumption by an application or other stream augmenting component. For example, method 900 can be performed by a device 700 and/or one or more components thereof to facilitate providing one or more pluggable stream augmenting components.

In method 900, optionally at action 902, one or more parameters regarding interfaces advertised for one or more devices or stream augmenting components can be received. In an aspect, stream augmenting component 718, e.g., in conjunction with stream server 706, processor 702, memory 704, etc., can receive the one or more parameters regarding the interfaces advertised for the one or more devices (e.g., sensor devices 708, 710, input devices 712, 714, etc.) or stream augmenting components (e.g., stream augmenting component 716). In an example, stream augmenting component 718 may receive the one or more parameters as part of performing an initialization on the stream server 706 to determine which augmentation functions can be activated based on whether associated interfaces indicated in a configuration for the augmentation functions are available. Thus, for example, during initialization, stream augmenting component 716 can receive the one or more parameters including a list of available interfaces to one or more devices or other stream augmenting components from the stream server 706, and may determine whether interfaces defined in its augmentation functions (e.g., augmentation function 722) are present. In another example, during initialization, stream augmenting component 716 can indicate the configuration to the stream server 706 indicating interfaces for its augmentation functions, and can receive the one or more parameters as an indication from the stream server 706 of which or whether interfaces for a given augmentation function are available.

In method 900, at action 904, a stream augmenting configuration indicating one or more augmentation functions related to a stream augmenting component can be advertised. In an aspect, stream augmenting component 718, e.g., in conjunction with stream server 706, processor 702, memory 704, etc., can advertise the stream augmenting configuration indicating the one or more augmentation functions (e.g., augmentation function 722) related to the stream augmenting component 718. For example, advertising the stream augmenting configuration can include providing the configuration to stream server 706 to allow the stream server 706 to initialize the stream augmenting component 718 and/or determine which other stream augmenting components can be initialized based on configurations for the various stream augmenting components. For example, as described, a stream augmenting component may leverage an output stream of another stream augmenting component, and thus stream server 706 can receive advertised configurations and determine which stream augmenting components can be activated based on whether stream augmenting components exposing utilized interfaces are present (e.g., are configured or are initialized by stream server 706). In another example, stream augmenting component 718 can advertise the configuration to the stream server 706 and/or other stream augmenting components (e.g., via the stream server 706 or otherwise) to facilitate determining types of stream outputs provided by the stream augmenting component 718 and accordingly generate or initialize stream augmenting components that obtain and modify data of the stream output 740 of augmentation function 722 of stream augmenting component 718.

In method 900, optionally at action 906, one or more devices or stream augmenting components can be controlled based on one or more interfaces indicated by the one or more augmentation functions. In an aspect, augmentation function 722, e.g., in conjunction with stream server 706, processor 702, memory 704, etc., can control the one or more devices (e.g., sensor device 708, 710, input device 712, etc.) or stream augmenting components (e.g., stream augmenting component 716) based on one or more interfaces indicated by the one or more augmentation functions (e.g., augmentation function 722). For example, augmentation function 722 can activate the one or more devices or stream augmentation components via a corresponding interface thereto (e.g., sensor interface 1 732, sensor interface 2 734, augmented stream interface 736, other input interface 738, etc.). In another example, augmentation function 722 can modify one or more parameters for operating the devices or stream augmenting components via the corresponding interfaces, such as a timing offset for operating the devices or components, etc.

In an example, augmentation function 722 can control the one or more devices or stream augmenting components based in part on receiving data in an output stream from one or more other devices or stream augmenting components, based in part on determining to control other devices or stream augmenting components, etc. In one specific example, augmentation function 722 can control sensor device 708 via sensor interface 1 732 to activate the sensor device 708, and can determine to also activate sensor device 710 via sensor interface 2 734 concurrently with sensor device 708 (e.g., based on determining to activate sensor device 708). In another specific example, augmentation function 722 can determine a timing offset between output streams received from sensor device 708 and sensor device 710 (e.g., based on a timestamp in data output via the output streams), and can control one or more of the sensor device 708 or sensor device 710 via the corresponding interface to operate using a timing offset, which can result in temporally correlated data from the sensor devices 708, 710.

In method 900, at action 908, a plurality of output streams corresponding to the plurality of interfaces for at least one augmentation function can be received. In an aspect, augmentation function 722, e.g., in conjunction with stream server 706, processor 702, and/or memory 704, can receive the plurality of output streams corresponding to the plurality of interfaces (e.g., interface 732, 734, 736, 738) for the at least one augmentation function (e.g., augmentation function 722). For example, stream server 706 can output the output streams as received from the corresponding devices (e.g., sensor devices 708, 710, input device 712, etc.) and/or stream augmenting components (e.g., stream augmenting component 716) to one or more applications, stream augmenting components (e.g., stream augmenting component 718), etc., based on the corresponding plurality of interfaces thereto. Moreover, in this regard, receiving the output streams can include receiving data from the output streams (e.g., framed data as output by the devices or stream augmenting components, other input data as output by other input devices, etc.). Accordingly, in an example, augmentation function 722 can receive framed data from the various output streams at varying cadences, and/or receive other input data when requested, etc.

In method 900, at action 910, data from the plurality of streams can be modified to generate one or more stream outputs for the at least one augmentation function. In an aspect, augmentation function 722, e.g., in conjunction with stream server 706, processor 702, memory 704, etc., can modify data from the plurality of streams to generate one or more stream outputs for the at least one augmentation function. For example, augmentation function 722 can aggregate data from the plurality of streams (e.g., via a stream aggregating component 112), as described, for including in an output stream (e.g., stream output 740), correlate data from the plurality of streams based on a temporal correlation (e.g., via a stream correlating component 116), spatial correlation, etc., output data with additional metadata (e.g., position or location information regarding the stream data), alter the data (e.g., based on other input data), etc. For example, augmentation function 722 can alter the data based on additional input data, which may include one or more filters for modifying the data, such as lens correction information for a camera sensor or other filters for images from a camera sensor (e.g., to reduce noise, reduce red eye, provide white noise balance, etc.), and/or the like. In any case, augmentation function 722 can modify the data to provide an augmented output stream.

In method 900, at action 912, the one or more stream outputs can be provided as input to at least one of an application or another stream augmenting component. In an aspect, stream server 706, e.g., in conjunction with augmentation function 722, stream augmenting component 718, processor 702, memory 704, etc. can provide the one or more stream outputs as input to at least one of an application (e.g., application 724, 726) or another stream augmenting component (e.g., stream augmenting component 720). For example, once the other stream augmenting component is activated or otherwise initialized, stream server 706 can provide output from the one or more stream outputs (e.g., stream output 740) to the one or more stream augmenting components 720, or to the applications 724, 726 executing and requesting the stream output(s) via a corresponding interface.

Figure 10:
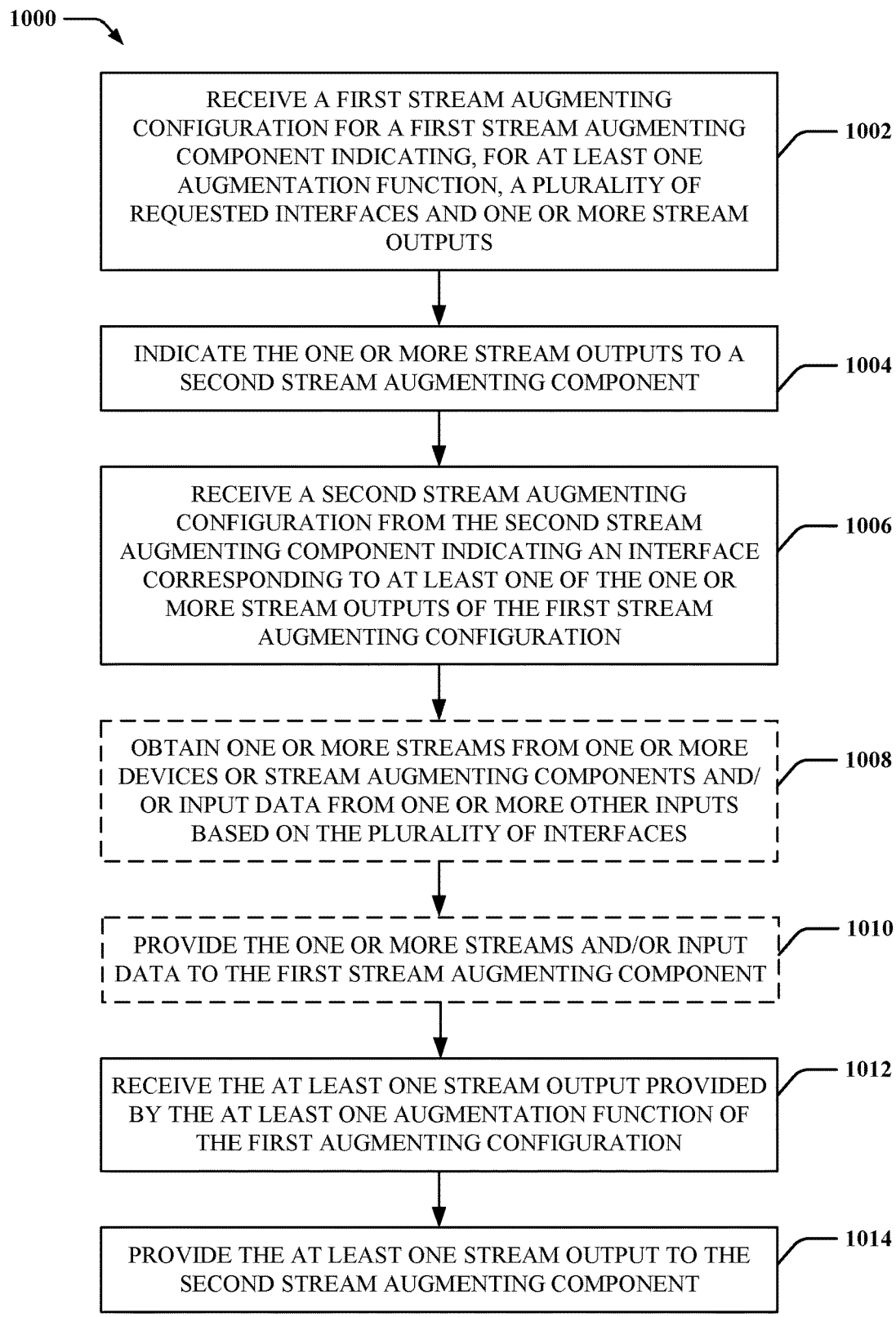
FIG. 10 is a flow diagram of an example of a method for managing one or more stream augmenting components.

FIG. 10 is a flowchart of an example of a method 1000 for facilitating operation of stream augmenting components for interfacing with multiple input devices or other stream augmenting components to generate and utilize output streams. For example, method 1000 can be performed by a device 700 and/or one or more components thereof (e.g., a stream server 706) to facilitate providing one or more pluggable stream augmenting components.

In method 1000, at action 1002, a first stream augmenting configuration can be received for a first stream augmenting component indicating, for at least one augmentation function, a plurality of requested interfaces and one or more stream outputs. In an aspect, stream server 706, e.g., in conjunction with processor 702, memory 704, etc., can receive the first stream augmenting configuration for a first stream augmenting component (e.g., stream augmenting component 718) indicating, for at least one augmentation function (e.g., augmentation function 722), a plurality of requested interfaces (e.g., interfaces 732, 734, 736, 738) and one or more stream outputs (e.g., stream output 740). In an example, the first stream augmenting configuration indicating the one or more stream outputs may indicate one or more interfaces exposed by the first stream augmenting component to receive the one or more stream outputs. In addition, the first stream augmenting configuration may also indicate one or more interfaces for controlling one or more aspects of the augmentation function 722 (e.g., to activate the augmentation function 722, apply a timing offset to stream output 740, etc.).

In an example, stream server 706 may receive the first stream augmenting configuration from the stream augmenting component 718 as part of a registration process for registering stream augmenting component 718 for use by the stream server 706, as part of initializing stream augmenting component 718 for executing via the stream server, 706, etc. In any case, stream server 706 may utilize the first stream augmenting configuration to determine one or more interfaces that may be exposed for use by other stream augmenting components and/or applications executing on an operating system of device 700 (e.g., which may be the operating system also executing stream server 706).

In method 1000, at action 1004, the one or more stream outputs can be indicated to a second stream augmenting component. In an aspect, stream server 706, e.g., in conjunction with stream augmenting component 718, processor 702, memory 704, etc., can indicate the one or more stream outputs (e.g., stream output 740) to a second stream augmenting component (e.g., stream augmenting component 720). For example, stream server 706 may expose the one or more stream outputs of stream augmenting component 718 (e.g., via one or more interfaces) for generating or initializing the second stream augmenting component 720. As described, in an example, stream server 706 may indicate the one or more stream outputs based on providing a list of available interfaces to the second stream augmenting component 720 (e.g., in a client context as described below in FIG. 5), based on determining whether one or more requested interfaces are available for the second stream augmenting component 720, etc.

In method 1000, at action 1006, a second stream augmenting configuration can be received from the second stream augmenting component indicating an interface corresponding to at least one of the one or more stream outputs of the first stream augmenting configuration. In an aspect, stream server 706, e.g., in conjunction with processor 702, memory 704, etc., can receive the second stream augmenting configuration from the second stream augmenting component (e.g., stream augmenting component 720) indicating an interface corresponding to at least one of the one or more stream outputs of the first stream augmenting configuration. As described, stream server 706 can receive the second stream augmenting configuration as part of a registration process for registering stream augmenting component 720 for use by the stream server 706, as part of initializing stream augmenting component 720 for executing via the stream server, 706, etc. In any case, stream server 706 can initialize the second stream augmenting component 720 to receive stream output 740 from first stream augmenting component 718.

In method 1000, optionally at action 1008, one or more streams from one or more devices or stream augmenting components and/or input data from one or more other inputs can be obtained based on the plurality of interfaces. In an aspect, stream server 706, e.g., in conjunction with processor 702, memory 704, etc., can obtain the one or more streams from one or more devices (e.g., sensor devices 708, 710) or stream augmenting components (e.g., stream augmenting component 716) and/or input data from one or more other inputs (e.g., other input device 712) based on the plurality of interfaces (e.g., interfaces 732, 734, 736, 738) indicated in the stream augmenting configuration. For example, stream server 706 can obtain the one or more streams or other input data based on the first stream augmenting configuration, which may include receiving the one or more streams according to a cadence of the streams, requesting other input data based on a request indicated by the first stream augmenting configuration or a corresponding augmentation function, etc. In one example, the one or more streams may be aggregated and output by a stream aggregating component 112, correlated and output by a stream correlating component 116, etc.

In method 1000, optionally at action 1010, the one or more streams and/or input data can be provided to the first stream augmenting component. In an aspect, stream server 706, e.g., in conjunction with processor 702, memory 704, etc., can provide the one or more streams and/or input data to the first stream augmenting component 718. As described, for example, stream server 706 can provide the one or more streams and/or other input data to the stream augmenting component 718 over corresponding interfaces 732, 734, 736, 738, which may include providing the one or more streams based on a cadence of the streams as received from the corresponding devices/stream augmenting components. Moreover, as described, stream augmenting component 718 can receive the streams and/or input data, and generate the one or more stream outputs (e.g., stream output 740), which can be provided to the stream server 706 for exposing to one or more other stream augmenting components or applications via a corresponding interface.

In method 1000, at action 1012, the at least one stream output provided by the at least one augmentation function of the first stream augmenting component can be received. In an aspect, stream server 706, e.g., in conjunction with processor 702, memory 704, etc., can receive the at least one stream output (e.g., stream output 740) provided by the at least one augmentation function (e.g., augmentation function 722) of the first stream augmenting component (e.g., stream augmenting component 718). For example, receiving the at least one stream output may include receiving data over the stream output as indicated by the first stream augmenting configuration. For example, stream server 706 can receive the at least one stream output from the at least one augmentation function as framed data sent based on a cadence, as described herein.

In method 1000, at action 1014, the at least one stream output can be provided to the second stream augmenting component. In an aspect, stream server 706, e.g., in conjunction with processor 702, memory 704, etc., can provide the at least one stream output (e.g., stream output 740) to the second stream augmenting component (e.g., stream augmenting component 720). For example, stream server 706 can expose the stream output 740 for receiving by the second stream augmenting component 720 as framed data sent based on a cadence by the first stream augmenting component 718, as described. Second stream augmenting component 720, for example, may utilize the stream output 740 as input to generate another augmented stream output.

Figure 11:
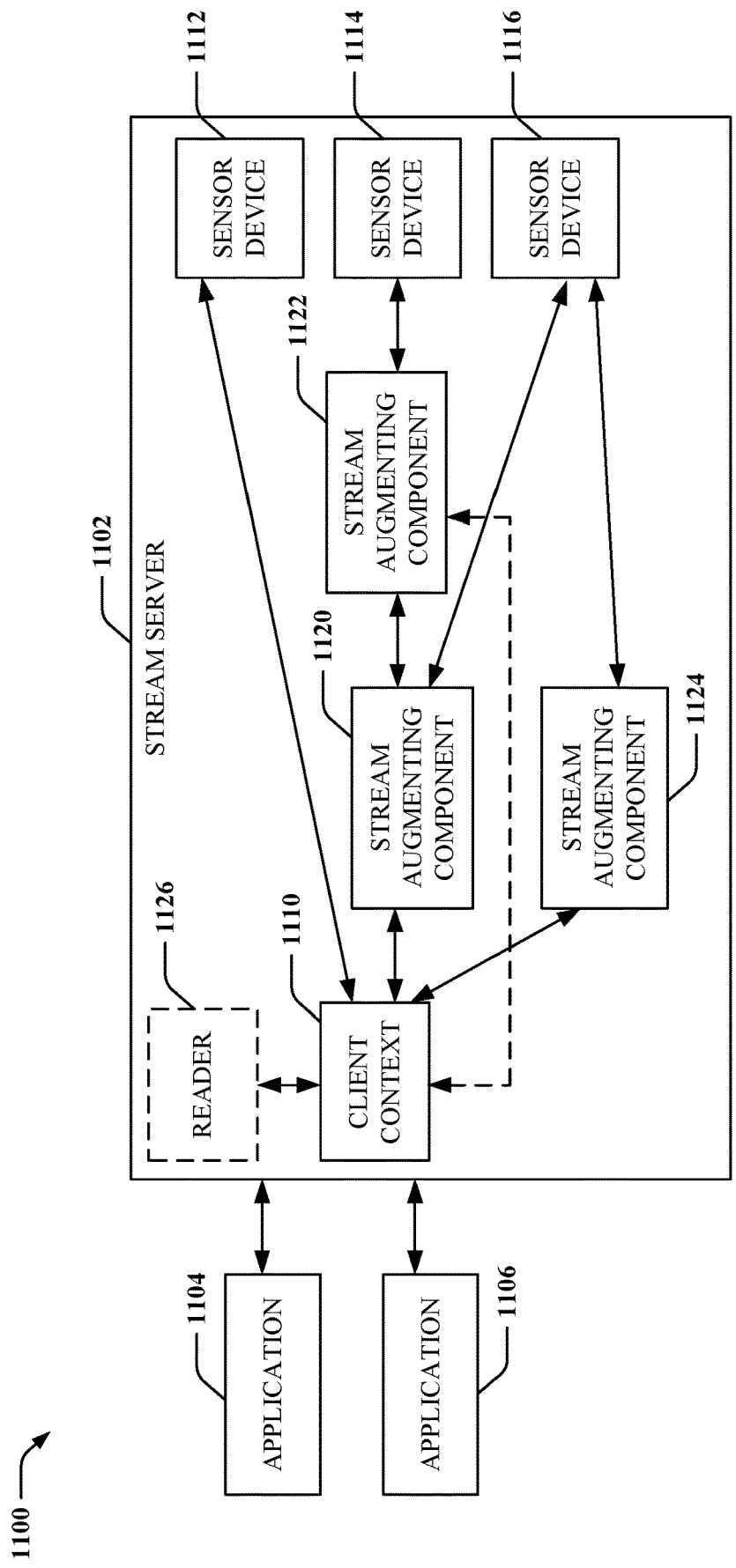
FIG. 11 is a schematic diagram of an example of a device having a plurality of stream augmenting components configured in a stream server.

FIG. 11 is a schematic diagram of an example of a device 1100 that can implement a stream server for providing access to one or more sensor devices. Device 1100, which can be similar to device 700 of FIG. 7, can include a stream server 1102, which can execute via a processor 102 and/or memory 104 of device 1100, as described above with respect to device 700. Stream server 1102 may be similar to stream server 706 in FIG. 7. For example, device 1100 can execute an operating system on which the stream server 1102 can execute. Additionally, device 1100 can include one or more applications 1104, 1106 (e.g., similar to applications 724, 726 in FIG. 1) that can also execute on the operating system and/or access one or more streams from the stream server 1102 (e.g., for providing data therefrom to an interface or otherwise utilizing data from the stream).

In an example, stream server 1102 can include a client context 1110 that can expose various interfaces to one or more sensor devices 1112, 1114, 1116, and/or stream augmenting components 1120, 1122, 1124 for utilization by the applications 1104, 1106 to control one or more devices 1112, 1114, 1116, or components 1120, 1122, 1124 and/or to obtain data streams therefrom. In one example, client context 1110 may expose the output of the stream augmenting components 1120, 1122, 1124 or sensor devices 1112, 1114, 1116 to a reader 1126, which may be similar to reader 122, for allowing applications 1104, 1106 to request and receive certain data that may be output by one or more of the stream augmenting components 1120, 1122, 1124 or sensor devices 1112, 1114, 1116. Additionally, the stream augmenting components 1120, 1122, 1124 may implement a stream aggregating component 112 for aggregating data from the one or more sensor devices 1112, 1114, 1116, stream augmenting components 1120, 1122, 1124, etc., as described. In another example, the stream augmenting components 1120, 1122, 1124 may implement a stream correlating component 116 for temporally correlating data from the one or more sensor devices 1112, 1114, 1116, stream augmenting components 1120, 1122, 1124, etc., as described.

As described above, the stream augmenting components 1120, 1122, 1124 can be pluggable components that are initialized by the stream server 1102 based on determining whether interfaces defined for the stream augmenting components 1120, 1122, 1124 (e.g., in a configuration thereof) are available. As described, for example, stream server 1102 can initialize the stream augmenting components 1120, 1122, 1124 in a hierarchy to ensure at least interfaces related to other stream augmenting components may be available. Accordingly, for example, stream server 1102 may initialize stream augmenting component 1122, and then initialize stream augmenting component 1120 so an interface from stream augmenting component 1122 can be determined to be available when initializing stream augmenting component 1120. In this regard, the stream augmenting components can be extended horizontally by chaining the stream augmenting components (e.g., stream augmenting components 1120, 1122, and so on where additional stream augmenting components can be between client context 1110 and sensor device 1114), or vertically by interfacing with multiple inputs (e.g., client context 1110 communicating with sensor devices 1112, 1114, and 1116 (e.g., via stream augmenting components 1120, 1122, and 1124), etc.).

In addition, for example, access to sensor devices 1112, 1114, 1116, or stream augmenting components 1120, 1122, 1124 via client context 1110 can be hierarchical as depicted, such that accessing a stream from, or controlling, sensor device 1114 can occur via stream augmenting component 1122, which can occur via stream augmenting component 1120 based on interfaces exposed by stream augmenting component 1120. In an example, sensor device 1114 may include a camera that exposes a raw data stream output based on capturing images by the camera. Stream augmenting component 1122, for example, may define an augmentation function for providing an interface to a lens corrected output stream based on lens correction data provided by a vendor of the camera in stream augmenting component 1122. Stream augmenting component 1120 can obtain the lens correction data via the interface to stream augmenting component 1122, but may not be able to access sensor device 1114 directly to receive the raw output stream from the camera. Thus, for example, stream augmenting component 1122 may limit interaction with sensor device 1114 by other applications and/or sensor augmenting components based on the exposed interfaces.

Similarly, stream augmenting component 1120 can obtain the lens corrected output stream and additionally modify the lens corrected output stream, such as by spatially correlating the lens corrected output stream with an output stream from sensor device 1116, such as a microphone. In a specific example, stream augmenting component 1120 may provide an augmentation function defining an interface for providing an output stream of images from the camera related to sensor device 1114 when the audio from the microphone related to sensor device 1116 achieves a threshold volume level. Thus, client context 1110 can access this interface via stream augmenting component 1120, but may not be able to access other interfaces/augmentation functions of the stream augmenting component 1122 and/or sensor device 1114. In another example, stream augmenting component 1122 may provide an augmentation function defining an interface for the lens corrected output stream (e.g., and/or an interface to control the stream augmenting component 1122, which may control sensor device 1114) directly to the client context 1110. Moreover, for example, stream augmenting component 1120 may provide an augmentation function to defining an interface for an output stream (e.g., and/or an interface to control the stream augmenting component 1120) for sensor device 1116.

In other examples, as shown, client context 1110 may access stream augmenting component 1124 to receive an output stream from, or possibly control one or more parameters of, sensor device 1116. Additionally, for example, client context 1110 may be able to access sensor device 1112 directly to obtain an output stream and/or modify one or more parameters thereof without a stream augmenting component (e.g., a stream augmenting component may not be present for sensor device 1112).

Figure 12:
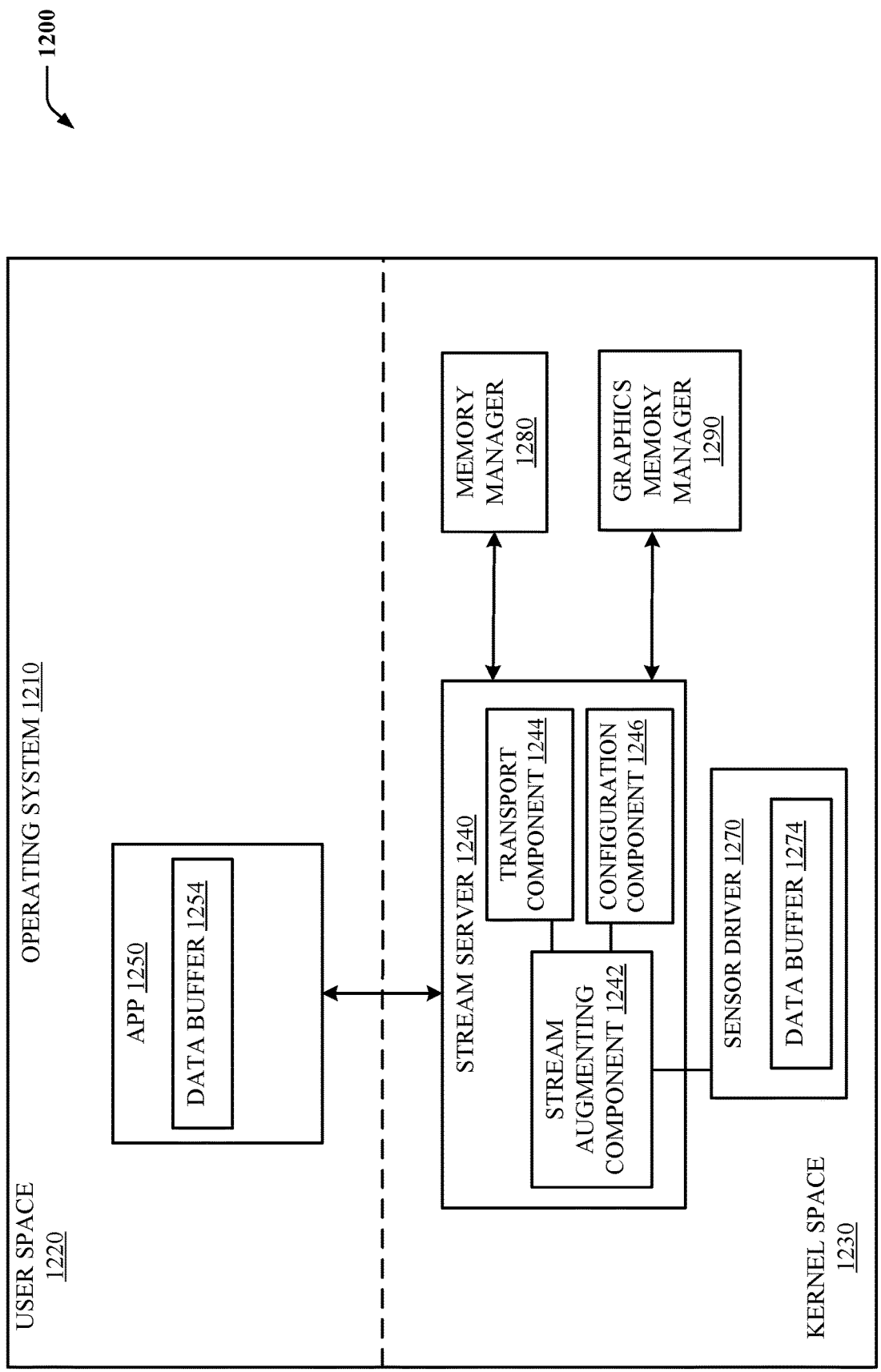
FIG. 12 is a schematic diagram of an example of a software architecture for implementing a stream server and stream augmenting components.

FIG. 12 is a system diagram of an example of a software architecture 1200 for using a stream server 1240 and/or corresponding stream augmenting components. An operating system 1210 can manage the execution of applications, manage the exchange of information among the applications, and provide services for the applications, such as by providing an interface to hardware sensors. The OS 1210 can also include a stream server 1240, which can be used to discover and configure one or more stream augmenting components 1242, and to manage transport of data from the resources of the stream server 1240 to the applications. For example, software architecture 1200 can be executed by a device 100, 1100 (e.g., via a processor 102, memory 104, etc.) to provide the aspects described below. Moreover, stream server 1240 may be similar to a stream server 106, 1102, and stream augmenting component 1242 (which may include multiple stream augmenting components) may be similar to stream augmenting components 716, 718, 720, 1120, 1122, 1124, etc. As described, stream augmenting component 1242 may include a stream aggregating component 112 for aggregating data from one or more sensor drivers 1270 or other stream augmenting components, or a stream correlating component 116 for temporally correlating data from one or more sensor drivers 1270 or other stream augmenting components.

The OS 1210 can divide the memory (e.g., memory 104 of a device 100) into different spaces corresponding to different privilege levels, where higher privileged processes have more access to memory and services and lower privileged processes have less access to memory and services. For example, the OS 1210 can divide the memory into a user space 1220 and a kernel space 1230. Applications (such as the application 1250) and lower privileged software routines can operate in the user space 1220 and higher privileged services of the OS 1210 can operate in the kernel space 1230. Separating the memory into the user space 1220 and the kernel space 1230 can increase security, privacy, and fault tolerance of the OS 1210 by limiting memory access of potentially faulty or malicious applications.

The OS 1210 can include different software routines, modules, or components for managing different aspects of the execution of programs. For example, the OS 1210 can include a stream server 1240 for managing streaming data, a memory manager 1280 for managing virtual and physical memory, a graphics memory manager 1290 for managing graphics memory, and a sensor driver 1270 for initializing and managing a hardware sensor (e.g., a sensor device, such as sensor device 708, 710, 1112, 1114, 1116). For example, the memory manager 1280 can be used to create a virtual memory space for a new process or application when the process is started, to allocate the virtual memory for various purposes, and to map virtual addresses to physical addresses and/or locations in secondary storage. The memory manager 1280 can track the virtual to physical mappings using page tables. The memory manager 1280 typically uses physical memory that is located within the system memory that is closely coupled to a CPU. The graphics memory manager 1290 can be similar to the memory manager 1280, except that the graphics memory manager 1290 can be used with graphics memory that is closely coupled to a GPU. Thus, the graphics memory manager 1290 and the memory manager 1280 operate on different non-overlapping portions of physical memory.

The sensor driver 1270 can be used by the OS 1210 to communicate with a hardware sensor. For ease of illustration, a single sensor driver 1270 is shown, but there can be multiple sensor drivers, such as a sensor driver for each type of sensor of the device. The sensor driver 1270 can be used to initialize and/or update registers of the sensors so that the sensor can be controlled. The sensor driver 1270 can be used to read the registers of the sensor so that the OS 1210 is aware of when data is available from the sensor. The sensor can also have embedded memory within the sensor for storing data collected by the sensor, and the sensor driver 1270 can be used to manage the transport of the data from the embedded physical memory to the OS 1210.

The stream server 1240 can use the stream augmenting component 1242 to manage the configuration of the sensors, transport of data from the sensors, modify data transported from the sensors, etc. For example, the stream server 1240 can include a transport component 1244 for managing data transport and a configuration component 1246 for managing configuration of the sensors, which may be via interfaces provided from stream augmenting component 1242, as described. Stream server 1240, e.g., via a client context, may publish topologies representative of available stream augmenting components 1242 and corresponding interfaces to access one or more other stream augmenting components and/or sensors.

The configuration component 1246 can also be used to create a buffer (e.g., data buffers 1254 and 1274) for transporting data from a sensor to an application. For example, when the sensor is used for the first time, a process (a producer process) and a virtual memory space can be created for the sensor device. The producer process can be used to produce and manage data transfer from the sensor and can include software routines of the sensor driver 1270. An application or stream augmenting component that is using the sensor data can be running in a different process (a consumer process). The producer process can be created as part of an initialization sequence of a device, when the application requests to use the sensor, or in response to launching an application associated with the sensor, for example. Physical memory can be allocated for the data buffer associated with the sensor. In particular, the data buffer can be allocated in a virtual address range of the producer process and physical memory can be mapped to the virtual address range. For example, the memory can be allocated by calling a service of the memory manager 1280, the graphics memory manager 1290, and/or the sensor driver 1270. Thus, the physical memory can be system memory which is closely coupled with the CPU, graphics memory which is closely coupled with the GPU, and/or embedded sensor memory which is closely coupled with the sensor. An address from within each page can be read (or probed) and locked in the physical memory. Locking the memory includes keeping the pages of the data buffer resident in physical memory so that the pages are not paged out to secondary storage. The physical memory can be shared with the calling or consuming application by assigning the physical memory pages to virtual addresses of the consuming process. Thus, different virtual addresses can map to the same physical address. The mappings of the producer virtual addresses, the consumer virtual addresses, and the physical addresses can be kept in a memory descriptor list or other data structure. A memory descriptor list can be an array or linked list of valid memory locations.

It should be noted that for ease of illustration, the description above describes only one division of functionality between the user space 1220 and the kernel space 1230. However, other divisions are possible. As one example, the stream augmenting component 1242 can be assigned to either the user space 1220 or the kernel space 1230. Also, the description above describes only one organization of the software functions of the OS 1210. For example, the stream augmenting component 1242 can be part of the stream server 1240, or the stream augmenting component 1242 can be separate from, but in communication with, the stream server 1240, etc.

Figure 13:
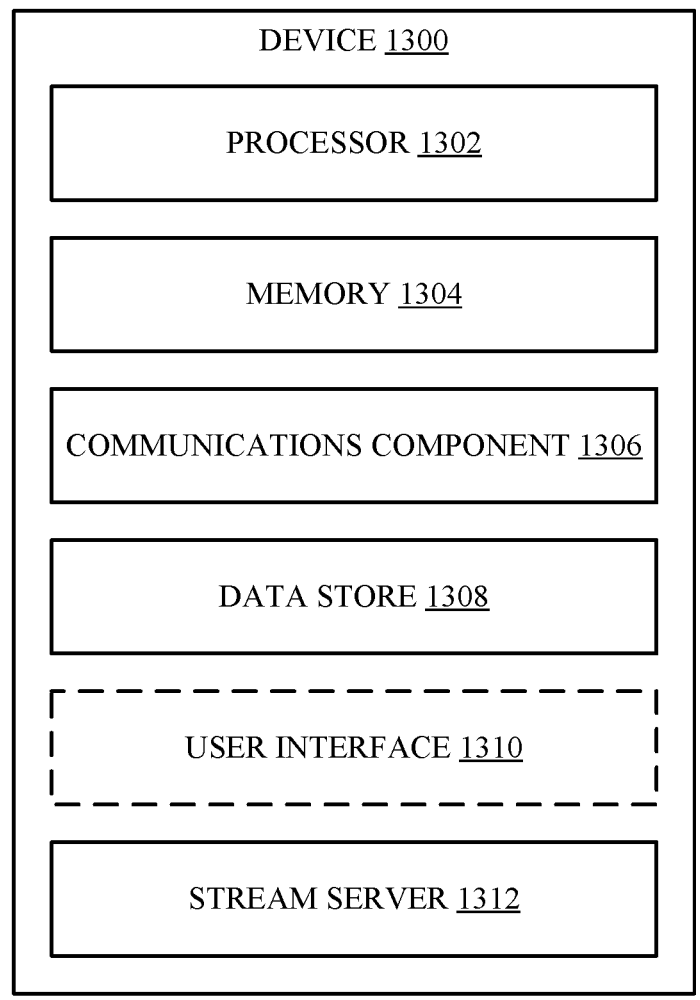
FIG. 13 is a schematic diagram of an example of a device for performing functions described herein.

FIG. 13 illustrates an example of device 1300 including additional optional component details as those shown in FIGS. 1 and/or 7. In one aspect, device 1300 may include processor 1302, which may be similar to processor 102, 702 for carrying out processing functions associated with one or more of components and functions described herein. Processor 1302 can include a single or multiple set of processors or multi-core processors. Moreover, processor 1302 can be implemented as an integrated processing system and/or a distributed processing system.

Device 1300 may further include memory 1304, which may be similar to memory 104, 704 such as for storing local versions of applications being executed by processor 1302, such as stream server 1312, applications related instructions, parameters, etc. Memory 1304 can include a type of memory usable by a computer, such as random access memory (RAM), read only memory (ROM), tapes, magnetic discs, optical discs, volatile memory, non-volatile memory, and any combination thereof.

Further, device 1300 may include a communications component 1306 that provides for establishing and maintaining communications with one or more other devices, parties, entities, etc. utilizing hardware, software, and services as described herein. Communications component 1306 may carry communications between components on device 1300, as well as between device 1300 and external devices, such as devices located across a communications network and/or devices serially or locally connected to device 1300. For example, communications component 1306 may include one or more buses, and may further include transmit chain components and receive chain components associated with a wireless or wired transmitter and receiver, respectively, operable for interfacing with external devices.

Additionally, device 1300 may include a data store 1308, which can be any suitable combination of hardware and/or software, that provides for mass storage of information, databases, and programs employed in connection with aspects described herein. For example, data store 1308 may be or may include a data repository for applications and/or related parameters (e.g., stream server 1312, applications, etc.) not currently being executed by processor 1302. In addition, data store 1308 may be a data repository for stream server 1312, applications, and/or one or more other components of the device 1300.

Device 1300 may optionally include a user interface component 1310 operable to receive inputs from a user of device 1300 and further operable to generate outputs for presentation to the user. User interface component 1310 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 1310 may include one or more output devices, including but not limited to a display, a speaker, a haptic feedback mechanism, a printer, any other mechanism capable of presenting an output to a user, or any combination thereof.

Device 1300 may additionally include a stream server 1312, which may be similar to stream server 106, 706, as described, for obtaining, aggregating, correlating, etc. data from a plurality of sensor devices, controlling a plurality of sensor devices or other input devices, and/or exposing modified output streams.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for obtaining data from a single stream output, comprising:
receiving, from an application, an indication of requested data from multiple stream sources;
receiving, from a stream server, the single stream output including one or more output frames with temporally correlated data of the multiple stream sources, where at least one output frame includes a plurality of containers, wherein at least two containers include data from different streams;

extracting the requested data from multiple containers of the plurality of containers that are determined to correspond to the requested data;

building a data structure comprising the requested data for providing to the application; and providing the data structure to the application.

2. The method of claim 1, further comprising providing an interface to facilitate indicating the requested data, wherein the indication of the requested data is received from the application via the interface.

3. The method of claim 2, further comprising:

querying the stream server to determine a set of data available from the multiple stream sources; and indicating at least a portion of the set of data for requesting via the interface.

4. The method of claim 1, further comprising:

determining whether the requested data from the multiple stream sources is available from the stream server; and requesting, from the stream server, correlation of one or more of the multiple stream sources into the single stream output where it is determined that the requested data is not available from the stream server.

5. The method of claim 1, wherein providing the data structure to the application corresponds to a cadence at which the single stream output is received from the stream server.

6. The method of claim 1, wherein providing the data structure to the application comprises at least one of responding to the indication of requested data with the data structure or calling a callback function with the data structure.

7. The method of claim 1, wherein the data structure includes data of different media types.

8. The method of claim 1, wherein at least one of the multiple stream sources includes a biometric sensor.

9. The method of claim 1, wherein at least one of the multiple stream sources includes at least one of a position determining device or a location determining device.

10. A device for obtaining data from a single stream output, comprising:

a memory storing one or more parameters or instructions for executing a stream server, wherein the stream server interfaces with a plurality of stream sources; and at least one processor coupled to the memory, wherein the at least one processor is configured to:

receive, from an application, an indication of requested data from multiple stream sources;

receive, from the stream server, the single stream output including one or more output frames with temporally correlated data of the multiple stream sources, where at least one output frame includes a plurality of containers, wherein at least two containers include data from different streams;

extract the requested data from multiple containers of the plurality of containers that are determined to correspond to the requested data;

build a data structure comprising the requested data for providing to the application; and provide the data structure to the application.

11. The device of claim 10, wherein the at least one processor is further configured to provide an interface to facilitate indicating the requested data, wherein the indication of the requested data is received from the application via the interface.

12. The device of claim 11, wherein the at least one processor is further configured to:

query the stream server to determine a set of data available from the multiple stream sources; and indicate at least a portion of the set of data for requesting via the interface.

13. The device of claim 10, wherein the at least one processor is further configured to:

determine whether the requested data from the multiple stream sources is available from the stream server; and request, from the stream server, correlation of one or more of the multiple stream sources into the single stream output where it is determined that the requested data is not available from the stream server.

14. The device of claim 10, wherein the at least one processor is configured to provide the data structure to the application corresponding to a cadence at which the single stream output is received from the stream server.

15. The device of claim 10, wherein the at least one processor is configured to provide the data structure to the application at least in part by at least one of responding to the indication of requested data with the data structure or calling a callback function with the data structure.

16. The device of claim 10, wherein the data structure includes data of different media types.

17. The device of claim 10, further comprising a biometric sensor, wherein at least one of the multiple stream sources corresponds to the biometric sensor.

18. The device of claim 10, further comprising at least one of a position determining device or a location determining device, wherein at least one of the multiple stream sources corresponds to at least one of the position determining device or the location determining device.

19. A non-transitory computer-readable medium, comprising code executable by one or more processors for obtaining data from a single stream output, the code comprising code for:

receiving, from an application, an indication of requested data from multiple stream sources;

receiving, from a stream server, the single stream output including one or more output frames with temporally correlated data of the multiple stream sources, where at least one output frame includes a plurality of containers, wherein two containers include at least data from different streams;

extracting the requested data from multiple containers of the plurality of containers that are determined to correspond to the requested data;

building a data structure comprising the requested data for providing to the application; and providing the data structure to the application.

20. The non-transitory computer-readable medium of claim 19, wherein the code further comprises code for providing an interface to facilitate indicating the requested data, wherein the indication of the requested data is received from the application via the interface.

21. The non-transitory computer-readable medium of claim 19, wherein the code further comprises code for:

determining whether the requested data from the multiple stream sources is available from the stream server; and requesting, from the stream server, correlation of one or more of the multiple stream sources into the single stream output where it is determined that the requested data is not available from the stream server.

22. The non-transitory computer-readable medium of claim 19, wherein the code for providing provides the data structure to the application corresponds to a cadence at which the single stream output is received from the stream server.

23. The non-transitory computer-readable medium of claim 19, wherein the code for providing provides the data structure to the application at least in part by at least one of responding to the indication of requested data with the data structure or calling a callback function with the data structure.

24. The non-transitory computer-readable medium of claim 19, wherein the data structure includes data of different media types.

25. The non-transitory computer-readable medium of claim 19, wherein at least one of the multiple stream sources includes a biometric sensor.

26. The non-transitory computer-readable medium of claim 19, wherein at least one of the multiple stream sources includes at least one of a position determining device or a location determining device.

* * * * *